(12) United States Patent
Nguyen et al.

(10) Patent No.: US 11,053,431 B2
(45) Date of Patent: Jul. 6, 2021

(54) FLY ASH MICROSPHERES FOR USE IN SUBTERRANEAN FORMATION OPERATIONS

(71) Applicant: Halliburton Energy Services, Inc., Houston, TX (US)

(72) Inventors: Philip D. Nguyen, Houston, TX (US); Jessica Lynn Heeter, Houston, TX (US); James William Ogle, Spring, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 15/510,673

(22) PCT Filed: Oct. 3, 2014

(86) PCT No.: PCT/US2014/058935
§ 371 (c)(1),
(2) Date: Mar. 10, 2017

(87) PCT Pub. No.: WO2016/053345
PCT Pub. Date: Apr. 7, 2016

(65) Prior Publication Data
US 2017/0218262 A1 Aug. 3, 2017

(51) Int. Cl.
*E21B 43/267* (2006.01)
*C09K 8/80* (2006.01)
(Continued)

(52) U.S. Cl.
CPC .............. *C09K 8/80* (2013.01); *C09K 8/62* (2013.01); *C09K 8/70* (2013.01); *C09K 8/805* (2013.01);
(Continued)

(58) Field of Classification Search
None
See application file for complete search history.

(56) References Cited

U.S. PATENT DOCUMENTS

| 4,506,734 A * | 3/1985 | Nolte | C09K 8/92 166/300 |
| 6,439,309 B1 * | 8/2002 | Matherly | C08G 69/48 166/276 |

(Continued)

FOREIGN PATENT DOCUMENTS

| EP | 2527586 A1 | 11/2012 |
| WO | 2007078995 A1 | 7/2007 |

OTHER PUBLICATIONS

Sutter et al. "Methods for Evaluating Fly Ash for Use in Highway Concrete" NCHRP Report 749 pp. 1-80, 2013.*

(Continued)

*Primary Examiner* — Charles R Nold
(74) *Attorney, Agent, or Firm* — McGuire Woods, LLP

(57) ABSTRACT

Treatment fluids including a base fluid; and fly ash microspheres, wherein the fly ash microspheres are of a material selected from the group consisting of Class C fly ash, Class F fly ash, and any combination thereof, wherein the fly ash microspheres have a diameter in the range of from about 0.1μm to about 150μm, and wherein the fly ash microspheres are present in the treatment fluid in an amount in the range of from about 0.001 ppg to about 1 ppg of the treatment fluid.

20 Claims, 5 Drawing Sheets

(51) Int. Cl.
*C09K 8/70* (2006.01)
*C09K 8/92* (2006.01)
*C09K 8/62* (2006.01)
*C09K 8/34* (2006.01)
*C09K 8/28* (2006.01)
*E21B 43/16* (2006.01)

(52) U.S. Cl.
CPC .............. *C09K 8/92* (2013.01); *E21B 43/166* (2013.01); *E21B 43/267* (2013.01); *C09K 2208/28* (2013.01); *C09K 2208/34* (2013.01)

(56) References Cited

U.S. PATENT DOCUMENTS

| | | | | |
|---|---|---|---|---|
| 2005/0016732 | A1* | 1/2005 | Brannon | C09K 8/64 166/308.1 |
| 2005/0274523 | A1 | 12/2005 | Brannon et al. | |
| 2006/0113080 | A1* | 6/2006 | Nguyen | C09K 8/665 166/308.1 |
| 2006/0157243 | A1* | 7/2006 | Nguyen | C09K 8/805 166/280.2 |
| 2007/0066791 | A1* | 3/2007 | Jernigan | C08G 63/181 528/272 |
| 2007/0202318 | A1* | 8/2007 | Smith | B01J 13/02 428/323 |
| 2011/0120712 | A1 | 5/2011 | Todd et al. | |
| 2012/0125617 | A1 | 5/2012 | Gu et al. | |
| 2013/0025867 | A1 | 1/2013 | Sun et al. | |
| 2013/0048282 | A1 | 2/2013 | Adams et al. | |
| 2013/0105157 | A1 | 5/2013 | Barmatov et al. | |
| 2013/0161003 | A1* | 6/2013 | Makarychev-Mikhailov | C09K 8/685 166/280.1 |
| 2013/0284437 | A1 | 10/2013 | Nguyen et al. | |
| 2015/0299560 | A1* | 10/2015 | Robl | C09K 8/80 166/280.2 |
| 2015/0315892 | A1* | 11/2015 | McDaniel | C09K 8/80 166/280.2 |
| 2016/0152889 | A1* | 6/2016 | Hopkins | C04B 33/1352 166/280.2 |

OTHER PUBLICATIONS

Kolay, Fuel 117 (2014) 118-124, Recovery of hollow spherical particles with two different densities from coal fly ash and their characterization.*

Cipolla, C. L., et al., "The Relationship Between Fracture Complexity, Reservoir Properties, and Fracture Treatment Design", 2008 SPE Annual Technical Conference and Exhibition, SPE 115769, 25 pages.

International Search Report and Written Opinion for PCT/US2014/058935 dated Jul. 3, 2015.

* cited by examiner

US 11,053,431 B2

FLY ASH MICROSPHERES FOR USE IN SUBTERRANEAN FORMATION OPERATIONS

BACKGROUND

The present disclosure relates to fly ash microspheres for use in subterranean formation operations and, more particularly, to enhancing fracture network complexity in subterranean formations using fly ash microspheres.

Hydrocarbon producing wells (e.g., oil producing wells, gas producing wells, and the like) are often stimulated by hydraulic fracturing treatments. In traditional hydraulic fracturing treatments, a treatment fluid, sometimes called a carrier fluid in cases where the treatment fluid carries particulates entrained therein, is pumped into a portion of a subterranean formation (which may also be referred to herein simply as a "formation") above a fracture gradient sufficient to break down the formation and create one or more fractures therein. The term "treatment fluid," as used herein, refers generally to any fluid that may be used in a subterranean application in conjunction with a desired function and/or for a desired purpose. The term "treatment fluid" does not imply any particular action by the fluid or any component thereof. As used herein, the term "fracture gradient" refers to a pressure (e.g., flow rate) necessary to create or enhance at least one fracture in a subterranean formation.

Typically, particulate solids, such as graded sand, are suspended in a portion of the treatment fluid and then deposited into the fractures. The particulate solids, known as "proppant particulates" or simply "proppant" serve to prevent the fractures from fully closing once the hydraulic pressure is removed. By keeping the fractures from fully closing, the proppant particulates form a proppant pack having interstitial spaces that act as conductive paths through which fluids produced from the formation may flow. The degree of success of a stimulation operation depends, at least in part, upon the ability of the proppant pack to permit the flow of fluids through the interconnected interstitial spaces between proppant particulates.

As used herein, the term "fracture network" refers to the access conduits, man-made or otherwise, within a subterranean formation that are in fluid communication with a wellbore. The complexity of the fracture network (or "network complexity") may be enhanced by stimulation (e.g., fracturing) operations to create new or enhance (e.g., elongate or widen) existing fractures. In some cases, the newly formed fractures may remain open without the assistance of proppant particulates due to shear offset of the formation forming the fractures (i.e., the formation in which the fracture is formed does not close perfectly, thereby leaving channels). In other cases, the fractures may be held open by proppant particulates, which may be of varying sizes depending type of fracture (i.e., depending on the size of the fractures in the fracture network). The inclusion of proppant particulates in the fractures—new or natural—may increase the conductivity of the formation.

Increasing fracture network complexity may be used in any type of subterranean formation including, but not limited to, low permeability formations. As used herein, the term "low permeability formation" refers to a formation that has a matrix permeability of less than 1,000 microDarcy (equivalent to 1 milliDarcy). Increasing fracture network complexity (e.g., keeping fractures, such as microfractures, opened) greatly increases the surface areas for the hydrocarbons (gas and/or oil) to desorb from the low permeability formation matrix (e.g., shale formation matrix), providing flow paths for these fluids to communicate with connected fractures (e.g., primary fractures or their large branches) and the wellbore for recovery.

BRIEF DESCRIPTION OF THE DRAWINGS

The following figures are included to illustrate certain aspects of the embodiments described herein, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
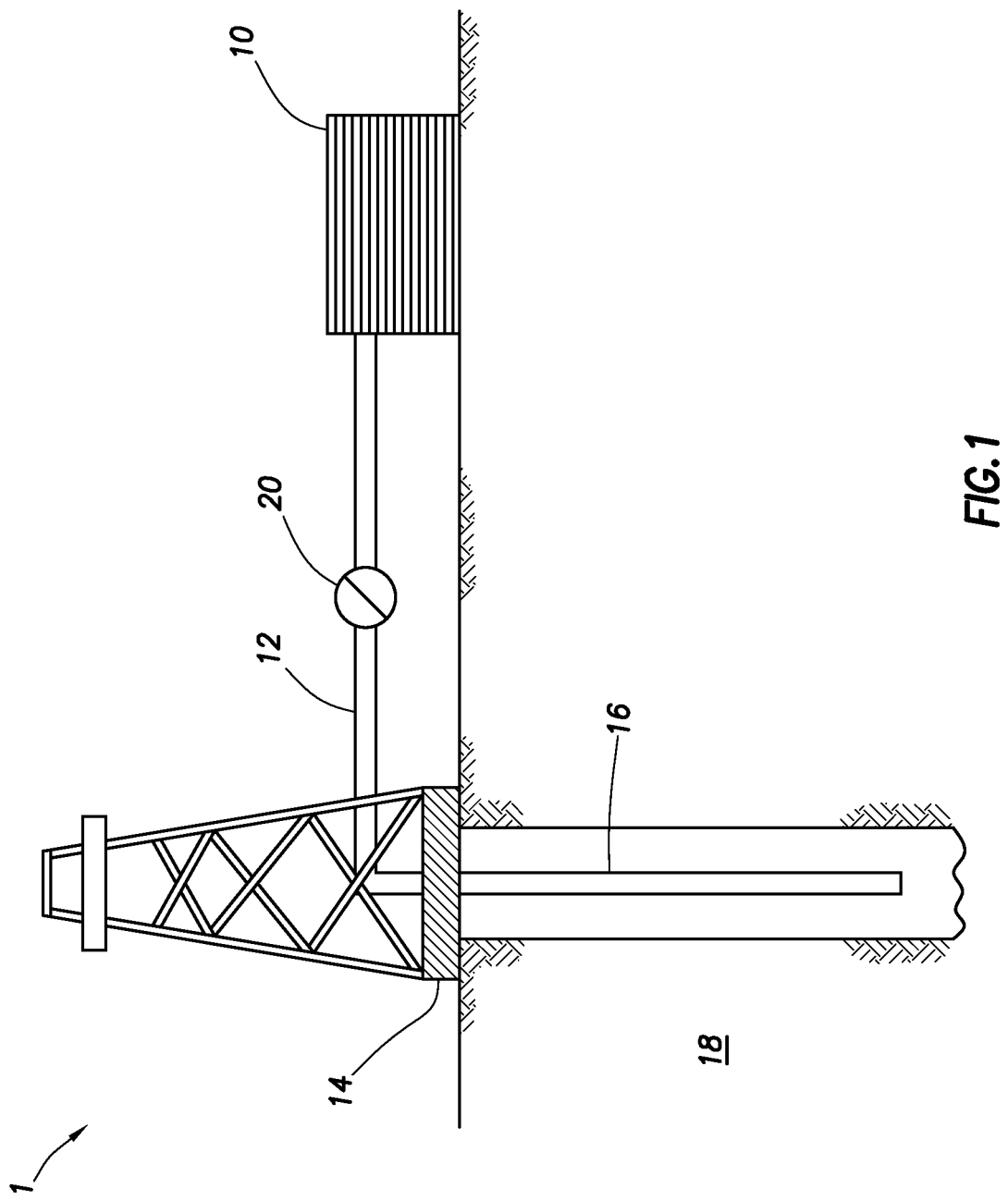
FIG. 1 depicts an embodiment of a system configured for delivering the treatment fluids of the embodiments described herein to a downhole location.

The present disclosure relates to fly ash microspheres for use in subterranean formation operations and, more particularly, to enhancing fracture network complexity in subterranean formations. In some embodiments, the fracture network complexity may be enhanced in the far-field region of a subterranean formation. As used herein, the term "far-field region" refers to a portion of a fracture network beyond a main fracture tip.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

Increasing fracture complexity in subterranean formations, including in low permeability subterranean formations, may increase the conductivity and productivity of the formation. The permeability of a formation is a measure of the formation's resistance to through-flow fluid. Thus, low permeability formations require considerable applied pressure in order to flow fluid through the formation, as compared to formations having higher permeabilities.

Examples of such low permeability formations include, but are not limited to, shale reservoirs and tight-gas sands. Shale reservoirs are sources of hydrocarbons comprising complex, heterogeneous rock with low permeability. Shale reservoirs are known to have permeabilities of about 0.001 milliDarcy ("mD") ($9.869233 \times 10^{-19}$ $m^2$) or less, and even about 0.0001 mD ($9.869233 \times 10^{-20}$ $m^2$) or less. Tight-gas sands are low permeability formations that produce mainly dry natural gas and may include tight-gas carbonates, tight-gas shales, coal-bed methane, and the like. Tight-gas sands may have permeabilities as low as about 1 mD ($9.869233 \times 10^{-16}$ $m^2$) or less, and even as low as about 0.01 mD ($9.869233 \times 10^{-18}$ $m^2$) or less.

The embodiments described herein employ fly ash microspheres and larger proppant particulates to create or enhance main fractures and microfractures and, respectively, prop them open. As used herein, the term "main fracture," refers to a primary fracture extending from a wellbore, generally having a length in the range of from a lower limit of about 3 meters ("m"), 18 m, 33 m, 48 m, 63 m, 78 m, 93 m, 108 m, 123 m, 138 m, and 153 m to an upper limit of about 300 m, 285 m, 270 m, 255 m, 240 m, 225 m, 210 m, 195 m, 180 m, 165 m, and 150 m (equivalent to about 10 feet to about 1000 feet), encompassing any value and subset therebetween. A "microfracture," as used herein, refers to a fracture extending from a main fracture or a secondary fracture extending from a main fracture, generally having a diameter in the range of from a lower limit of about 0.3 m, 0.9 m, 1.5 m, 2.1 m, 2.7 m, 3.3 m, 3.9 m, 4.5 m, 5.1 m, 5.7 m, 6.3 m, 6.9 m, and 7.5 to an upper limit of about 15 m, 14.4 m, 13.8 m, 13.2 m, 12.6 m, 12 m, 11.4 m, 10.8 m, 10.2 m, 9.6 m, 9 m, 8.4 m, 7.8 m, and 7.2 m (equivalent to about 1 feet to about 50 feet), encompassing any value and subset therebetween. Accordingly, each of the main fractures and microfractures decrease progressively in length. As used herein, unless otherwise stated, the term "fracture" or "fractures" will refer collectively to both main fractures and microfractures. The width of the fractures may be dictated by closures after hydraulic pressure is removed.

In some embodiments, the present disclosure provides a method of introducing a first treatment fluid into a subterranean formation at a rate and pressure above the fracture gradient of the formation, and thus sufficient to create or enhance at least a first fracture network comprising at least a first main fracture and a first microfracture. The first treatment fluid may comprise a first base fluid and fly ash microspheres. As used herein, the term "fly ash microspheres" refers to a lightweight, inert, hollow, substantially spherical particulates consisting of, or consisting essentially of, fly ash that may be used as a type of particulate to prop open a fracture in a subterranean formation. As used herein, the term "substantially" means largely, but not necessarily wholly. Fly ash is a fine, powdery material that is produced by burning coal, primarily in pulverized coal combustion burners. It is composed mainly of non-combustible inorganic material, but also contains some carbon that is leftover from partially combusted coal. Fly ash is generally substantially spherical in shape. The spherical shape of fly ash results from the formation of tiny molten droplets as the ash travels through the boiler. The droplets form spheres because this shape minimizes the surface area relative to the volume.

The fly ash microspheres in the first treatment fluid may be placed into the at least one first microfracture to form at least a partial monolayer therein. As used herein, the term "partial monolayer" refers to a type of proppant pack in which particulates (e.g., fly ash microspheres, proppant particulates, and the like) are capable of holding a fracture open, wherein the separation between any one point of the fracture faces may be less than, or about the same, as the largest exterior dimension of any one of the particulates. Accordingly, in some embodiments, only a partial monolayer of fly ash microspheres is formed in the first microfracture, and the at least partial monolayer serves to maintain open the first microfracture. However, at least a partial multilayer of the fly ash microspheres may also be formed in the first microfracture, serving to maintain open the first microfracture, without departing from the scope of the present disclosure. As used herein, the term "partial multilayer" refers to a type of proppant pack in which particulates (e.g., fly ash particulates, proppant particulates, and the like) are capable of holding a fracture open, wherein the separation between any one point of the fracture faces may be more than the largest exterior dimension of any one of the particulates. In a partial monolayer and/or partial multilayer, the particulates may be spaced closely or widely apart in the fracture.

After placing the fly ash microspheres into the first microfracture, a second treatment fluid comprising a second base fluid and proppant particulates may be introduced into the subterranean formation at a rate and pressure above the fracture gradient. The second treatment fluid may be introduced above the fracture gradient to ensure that the first main fracture and the first microfracture created or enhanced by the first treatment fluid remain open during the duration of the treatment. The proppant particulates may thereafter be placed in the first main fracture to form at least a partial monolayer therein. Like the fly ash microspheres in the first microfracture, the proppant particulates may form a partial monolayer in the first main fracture but may, in some instances, form a multilayer in the first main fracture, without departing from the scope of the present disclosure.

The methods described herein may be repeated at various intervals within a subterranean formation so as to form at least a second microfracture and a second main fracture, wherein at least a partial monolayer is formed in the microfracture by the fly ash microspheres (or consolidating agent coated fly ash microspheres described below) and in the main fracture by the proppant particulates (or consolidating agent coated proppant particulates described below.

As used herein, the term "treatment fluid" may be used to refer to both the first treatment fluid or the second treatment fluid collectively, unless otherwise specifically stated. In some embodiments, the treatment fluids described herein may be created on-the-fly. As used herein, the term "on-thefly" refers to performing an operation during a subterranean treatment that does not require stopping normal operations. For example, the first base fluid and the fly ash microspheres of the first treatment fluid may be metered (the term "metered," as used herein, encompasses both continuous metering and intermittent metering) into a formation separately, but at the same time. Similarly, the second base fluid and the proppant particulates of the second treatment fluid may be metered into a formation separately, but at the same time. In other embodiments, the treatment fluids comprising all components may be introduced into the subterranean formation in a single operation. The selection of the method of introducing the components of the treatment fluids may depend on a number of factors including, but not limited to, the type of operation being performed, the conditions for storage of the fluids, any additional additives in the fluids as discussed below, and the like.

As used herein, the term "base fluid" may be used to collectively refer to the first base fluid and the second base fluid, unless otherwise specifically stated. As used herein, the term "fluid" refers to liquids, gases, and mixtures thereof. Suitable base fluids for use in the treatment fluids described herein (i.e., both the first and second treatment fluids) may be any base fluids capable of use in a subterranean formation operation that does not adversely affect the fly ash microspheres or proppant particulates in the treatment fluids. Suitable base fluids may include, but are not limited to, oil-base fluids, aqueous-base fluids, aqueous-miscible base fluids, water-in-oil emulsion base fluids, oil-in-water emulsion base fluids, gaseous base fluids, and any combination thereof. Suitable oil-base fluids may include, but are not limited to, alkanes, olefins, aromatic organic compounds, cyclic alkanes, paraffins, diesel fluids, mineral oils, desulfurized hydrogenated kerosenes, and any combination thereof. Suitable aqueous-base fluids may include, but are not limited to, fresh water, saltwater (e.g., water containing one or more salts dissolved therein), brine (e.g., saturated salt water), seawater, and any combination thereof. Suitable aqueous-miscible base fluids may include, but are not limited to, alcohols (e.g., methanol, ethanol, n-propanol, isopropanol, n-butanol, sec-butanol, isobutanol, and t-butanol), glycerins, glycols (e.g., polyglycols, propylene glycol, and ethylene glycol), polyglycol amines, polyols, any derivative thereof, any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), any in combination with an aqueous-base fluid, and any combination thereof.

Suitable water-in-oil emulsion base fluids, also known as invert emulsions, may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, encompassing any value and subset therebetween. Suitable oil-in-water emulsion base fluids, also known as invert emulsions, may have an water-to-oil ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, encompassing any value and subset therebetween. It should be noted that for water-in-oil and oil-in-water emulsion base fluids, any mixture of the above may be used including the water being and/or comprising an aqueous-miscible fluid.

Suitable gaseous base fluids may include, but are not limited to, methane, propane, ethane, butane, ammonium-based gases, steam, hydrogen, carbon dioxide, natural gas, nitrogen, air, flue gas, and any combination thereof.

In some embodiments, the first and/or second treatment fluids herein may be foamed when a liquid fluid is used to aid in pumpability and/or placement of the fly ash microspheres and/or proppant particulates at a desired location or to adjust the density of the treatment fluids, for example. As used herein, the term "foam" refers to a two-phase composition having a continuous liquid phase and a discontinuous gas phase. In some embodiments, the treatment fluids may be foamed by the addition of a gas and a foaming agent.

Suitable gases for use in conjunction with the embodiments of the present disclosure may include, but are not limited to, nitrogen, carbon dioxide, air, methane, helium, argon, and any combination thereof. Each gas may be beneficial in certain subterranean environments. By way of nonlimiting example, carbon dioxide foams may have deeper well capability than nitrogen foams because carbon dioxide emulsions have greater density than nitrogen gas foams so that the surface pumping pressure required to reach a corresponding depth is lower with carbon dioxide than with nitrogen. Moreover, the higher density may impart greater particulate transport capability.

In some embodiments, the quality of the foamed treatment fluids may range from a lower limit of about 5%, 10%, 15%, 20%, 25%, 30%, 35%, 40%, 45%, 50%, 55%, 60%, 65%, or 70% gas volume to an upper limit of about 95%, 90%, 85%, 80%, 75%, 70%, 65%, 60%, 55%, or 50% gas volume, encompassing any value and subset therebetween. Most preferably, the foamed treatment fluids may have a foam quality from about 85% to about 95%, or about 90% to about 95%.

Suitable foaming agents for use in conjunction with the embodiments of the present disclosure may include, but are not limited to, cationic foaming agents, anionic foaming agents, amphoteric foaming agents, nonionic foaming agents, or any combination thereof. Nonlimiting examples of suitable foaming agents may include, but are not limited to, surfactants like betaines, sulfated or sulfonated alkoxylates, alkyl quarternary amines, alkoxylated linear alcohols, alkyl sulfonates, alkyl aryl sulfonates, C10-C20 alkyldiphenyl ether sulfonates, polyethylene glycols, ethers of alkylated phenol, sodium dodecylsulfate, alpha olefin sulfonates such as sodium dodecane sulfonate, trimethyl hexadecyl ammonium bromide, and the like, any derivative thereof, and any combination thereof. Foaming agents may be included at concentrations ranging typically from a lower limit of about 0.05%, 0.1%, 0.2%, 0.3%, 0.4%, 0.5%, 0.6%, 0.7%, 0.8%, 0.9%, and 1% to an upper limit of about 2%, 1.9%, 1.8%, 1.7%, 1.6%, 1.5%, 1.4%, 1.3%, 1.2%, 1.1%, and 1% of the liquid component of the treatment fluids (e.g., the base fluid) by weight (e.g., from about 0.5 to about 20 gallons per 1000 gallons of liquid), encompassing any value and subset therebetween.

Referring now to the fly ash microspheres of the present disclosure, fly ash is generated as a byproduct of combustion and typically coal combustion. Depending on the source and makeup of the combustible material fly ash may typically be comprised substantially of one or more of silicon dioxide (both amorphous and crystalline) and calcium carbonate. Other lesser materials included in fly ash may include, but are not limited to, arsenic, beryllium, boron, cadmium, chromium, hexavalent chromium, cobalt, lead, manganese, mercury, molybdenum, selenium, strontium, thallium, vanadium, dioxins, polycyclic aromatic hydrocarbons, and any combination thereof.

In some embodiments, the fly ash material forming the fly ash microspheres described here are designated as Class C fly ash, Class F fly ash, and any combination thereof. Class C fly ash is generally produced from burning of lignite or subbituminous coal. Class C fly ash exhibits pozzolanic self-cementing properties. Typically, Class C fly ash contains more than 20% calcium oxide. Class F fly ash is generally produced from burning anthracite and bituminous coal. Class F fly ash also exhibits pozzolanic properties and typically contains less than 20% calcium oxide. In some embodiments, Class C fly ash is the preferred material for forming the fly ash microspheres of the present disclosure due to its chemical makeup and associated properties, or a majority (greater than at least 50%) of the material forming the fly ash microspheres is Class C fly ash.

As mentioned previously, the fly ash microspheres of the present disclosure are composed of fly ash and characterized as lightweight, inert, hollow, substantially spherical particulates capable of propping open a fracture in a subterranean formation. For example, in some embodiments, the fly ash microspheres have a diameter in the range of a lower limit of about 0.1 µm, 0.5 µm, 1 µm, 5 µm, 10 µm, 15 µm, 20 µm, 25 µm, 30 µm, 35 µm, 40 µm, 45 µm, 50 µm, 55 µm, 60 µm, 65 µm, 70 µm, and 75 µm to an upper limit of about 150 µm, 145 µm, 140 µm, 135 µm, 130 µm, 125 µm, 120 µm, 115 µm, 110 µm, 105 µm, 100 µm, 95 µm, 90 µm, 85 µm, 80 µm, and 75 µm, encompassing any value and subset therebetween.

In some embodiments, the fly ash microspheres may be present in the first treatment fluid in an amount in the range of a lower limit of about 0.001 pounds per gallon ("ppg"), 0.005 ppg, 0.01 ppg, 0.05 ppg, 0.1 ppg, 0.15 ppg, 0.2 ppg, 0.25 ppg, 0.3 ppg, 0.35 ppg, and 0.4 ppg to an upper limit of about 1 ppg, 0.95 ppg, 0.9 ppg, 0.85 ppg, 0.8 ppg, 0.75 ppg, 0.7 ppg, 0.65 ppg, 0.6 ppg, 0.55 ppg, 0.5 ppg, 0.45 ppg, and 0.4 ppg of the first treatment fluid, encompassing any value and subset therebetween. In some embodiments, the fly ash microspheres are present in the first treatment fluid in an amount in the range of a lower limit of about 0.01 ppg to an upper limit of about 0.5 ppg, encompassing any value and subset therebetween.

The proppant particulates for use in the second treatment fluid of the present disclosure are generally larger in diameter than the fly ash microspheres and are used to form at least a partial monolayer in the first main fracture. Proppant particulates suitable for use in the second treatment fluids described herein may comprise any material suitable for use in subterranean operations. Suitable materials for these proppant particulates may include, but are not limited to, sand, bauxite, gravel, ceramic materials, glass materials, polymeric materials (e.g., ethylene vinyl acetate or composite materials), polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and any combination thereof. Suitable composite particulates may comprise a stabilizing agent and a filler material wherein suitable filler materials may include, but are not limited to, include silica, alumina, fumed carbon, carbon black, graphite, mica, titanium dioxide, barite, metasilicate, calcium silicate, kaolin, talc, zirconia, boron, fly ash, hollow glass microspheres, solid glass, and any combination thereof. Suitable stabilizing agents for forming the composite proppant particulates may include, but are not limited to, any of the consolidating agents described below.

In some embodiments, the proppant particulates for use in the second treatment fluids described herein have a diameter in the range of a lower limit of about 150 µm, 175 µm, 200 µm, 225 µm, 250 µm, 275 µm, 300 µm, 325 µm, 350 µm, 375 µm, 400 µm, 425 µm, 450 µm, 475 µm, 500 µm, 525 µm, 550 µm, 575 µm, 600 µm, 625 µm, 650 µm, 675 µm, and 700 µm to an upper limit of about 1250 µm, 1225 µm, 1200 µm, 1175 µm, 1150 µm, 1100 µm, 1075 µm, 1050 µm, 1025 µm, 1000 µm, 975 µm, 950 µm, 925 µm, 900 µm, 875 µm, 850 µm, 825 µm, 800 µm, 775 µm, 750 µm, 725 µm, and 700 µm, encompassing any value and subset therebetween.

In some embodiments, the proppant particulates described herein may be present in the range of a lower limit of about 0.1 ppg, 0.25 ppg, 0.5 ppg, 0.75 ppg, 1 ppg, 1.25 ppg, 1.5 ppg, 1.75 ppg, 2 ppg, 2.25 ppg, 2.5 ppg, 2.75 ppg, 3 ppg, 3.25 ppg, 3.5 ppg, 3.75 ppg, 4 ppg, 4.25 ppg, 4.5 ppg, 4.75 ppg, 5 ppg, and 5.25 ppg to an upper limit of about 12 ppg, 11.75 ppg, 11.5 ppg, 11.25 ppg, 11 ppg, 10.75 ppg, 10.5 ppg, 10.25 ppg, 10 ppg, 9.75 ppg, 9.5 ppg, 9.25 ppg, 9 ppg, 8.75 ppg, 8.5 ppg, 8.25 ppg, 8 ppg, 7.75 ppg, 7.5 ppg, 7.25 ppg, 7 ppg, 6.75 ppg, 6.5 ppg, 6.25 ppg, 6 ppg, 5.75 ppg, 5.5 ppg, and 5.25 ppg of the second treatment fluid, encompassing any value and subset therebetween.

In some embodiments, a consolidating agent may be used in combination with the compositions and methods described herein employing fly ash microspheres. For example, in certain embodiments, a consolidating agent may be included in first or second treatment fluid. The consolidating agent may, in some instances, coat a face of the subterranean formation as it is introduced into the formation in the treatment fluids described herein. As used herein, the term "formation face," and grammatical variants thereof (e.g., "face of a formation," "face of a subterranean formation," and the like) refers to any portion of the formation that is exposed to a material introduced into the formation (e.g., a fluid, a particulate, and the like). A formation face includes a face of a fracture (e.g., the main fracture and/or microfracture, and the like). As used herein, the term "coat" does not imply any particular degree of coverage of a surface. The consolidating agent may be coated onto the formation face to reduce the migration of unconsolidated particulates in the subterranean formation. As used herein, the term "unconsolidated particulates" refers to any loose or loosely bonded particulates that may move through the formation with wellbore fluids (e.g., production fluids). Unconsolidated particulates may include, for example, sand, gravel, other particulates (e.g., fly ash microspheres, proppant particulates, and the like), and/or formation fines.

In embodiments where a consolidating agent is included in the treatment fluids of the present disclosure, the consolidating agent may be present in the range of a lower limit of about 0.01%, 0.025%, 0.05%, 0.075%, 0.1%, 0.25%, 0.5%, 0.75%, 1%, 1.25%, 1.5%, 1.75%, 2%, and 2.25% to an upper limit of about 5%, 4.75%, 4.5%, 4.25%, 4%, 3.75%, 3.5%, 3.25%, 3%, 2.75%, 2.5%, and 2.25% by volume of the first or second treatment fluids, encompassing any value and subset therebetween.

In other embodiments, a consolidating agent may be coated onto the fly ash microspheres. Such coating may be accomplished prior to introducing the fly ash microspheres into the first treatment fluid (i.e., pre-coated fly ash microspheres) or may occur naturally in the first treatment fluid by association of a free-floating consolidating agent with the fly ash microspheres. In such instances, the consolidating agent may both coat the fly ash microspheres and coat a portion of a face of the subterranean formation, as well. Similarly, the proppant particulates of the present disclosure may be coated with a consolidating agent either prior to introduction into the second treatment fluid or by natural association with a free-floating consolidating agent in the second treatment fluid. The consolidating agent coated fly ash microspheres may serve to at least partially consolidate the at least partial monolayer formed in the microfractures and may also serve to prevent unconsolidated particulates from entering the wellbore. Likewise, the consolidating agent coated proppant particulates may serve to at least partially consolidate the at least partial monolayer in the main fracture and may also serve to prevent unconsolidated particulates from entering the wellbore.

The consolidating agent for use in the embodiments of the present disclosure may include any compound that is capable of minimizing particulate migration (e.g., the fly ash microspheres, the proppant particulates, unconsolidated particulates, and the like). Suitable consolidating agents may include, but are not limited to, a non-aqueous tackifying agent, an aqueous tackifying agent, a silyl-modified polyamide compound, a resin, a crosslinkable aqueous polymer composition, a polymerizable organic monomer composition, a zeta potential-modifying aggregating composition, a silicon-based resin, a binder, a consolidating agent emulsion, and any combination thereof.

In some embodiments of the present disclosure, the consolidating agent may comprise a non-aqueous tackifying agent. A particularly preferred group of non-aqueous tackifying agents comprises polyamides that are liquids or in solution at the temperature of the subterranean formation such that they are, by themselves, nonhardening when introduced into the subterranean formation. A particularly preferred product is a condensation reaction product comprised of a polyacid and a polyamine. Such products may further include compounds such as combinations of dibasic acids containing some trimer and higher oligomers and also small amounts of monomer acids that are reacted with polyamines. Other polyacids include trimer acids, synthetic acids produced from fatty acids, maleic anhydride, acrylic acid, and the like. Combinations of these may be suitable as well.

Additional compounds which may be used as non-aqueous tackifying agents include liquids and solutions of, for example, polyesters, polycarbonates, silyl-modified polyamide compounds, polycarbamates, urethanes, natural resins such as shellac, and the like. Combinations of these may be suitable as well.

Non-aqueous tackifying agents suitable for use in the embodiments of the present disclosure may either be used such that they form a nonhardening coating on a surface (e.g., a formation face or the surface of a particulate) or they may be combined with a multifunctional material capable of reacting with the non-aqueous tackifying agent to form a hardened coating. A "hardened coating," as used herein, means that the reaction of the tackifying compound with the multifunctional material should result in a substantially non-flowable reaction product that exhibits a higher compressive strength in a consolidated agglomerate than the tackifying compound alone. In this instance, the non-aqueous tackifying agent may function similarly to a hardenable resin.

Multifunctional materials suitable for use in the embodiments of the present disclosure may include, but are not limited to, aldehydes, dialdehydes (e.g., glutaraldehyde), hemiacetal-releasing compounds, aldehyde releasing compounds, diacid halides, dihalides (e.g., dichlorides and dibromides), polyacid anhydrides, epoxides, furfuraldehyde, aldehyde condensates, silyl-modified polyamide compounds (described below), and the like, and any combination thereof.

In some embodiments, the multifunctional material may be mixed with the non-aqueous tackifying compound in an amount of a lower limit of about 0.01%, 1%, 5%, 10%, 15%, 20%, and 25% to an upper limit of about 50%, 45%, 40%, 35%, 30%, and 25% by weight of the non-aqueous tackifying compound, encompassing any value and any subset therebetween. In other embodiments, the multifunctional material is present in an amount of about 0.5% to about 1% by weight of the non-aqueous tackifying compound.

Aqueous tackifying agents suitable for use in the embodiments of the present disclosure are usually not generally significantly tacky when placed onto a particulate, but are capable of being "activated" (e.g., destabilized, coalesced and/or reacted) to transform the compound into a sticky, tacky compound at a desirable time. Such activation may occur before, during, or after the aqueous tackifier agent is placed in a subterranean formation. As used herein, the term "tacky," and all grammatical variants thereof, refers to a substance having a nature such that it is somewhat sticky to the touch and capable of being applied to a solid substrate (e.g., a formation face or particulate). In some embodiments, a pretreatment may be first contacted with the surface of a formation face or particulate to prepare it to be coated with an aqueous tackifying agent. Suitable aqueous tackifying agents may be charged polymers that comprise compounds that, when in a treatment fluid, will form a non-hardening coating (by itself or with an activator). In some embodiments, the aqueous tackifying agent, when coated onto a particulate, will increase the continuous critical resuspension velocity of the particulate when included in a treatment fluid. The aqueous tackifying agent may enhance the grain-to-grain contact between the individual particulates within the formation (be they fly ash microspheres, proppant particulates, unconsolidated particulates, or other particulates), helping bring about the consolidation of the particulates into a cohesive, flexible, and permeable mass (e.g., a partial monolayer or a partial multilayer).

Suitable aqueous tackifying agents may include any polymer that can bind, coagulate, or flocculate a particulate, whether coated onto a particulate or a formation face. Also, polymers that function as pressure-sensitive adhesives may be suitable. Examples of aqueous tackifying agents suitable for use in the embodiments herein may include, but are not limited to, an acrylic acid polymer, an acrylic acid ester polymer, an acrylic acid derivative polymer, an acrylic acid homopolymer, an acrylic acid ester homopolymer (e.g., poly(methyl acrylate), poly(butyl acrylate), poly(2-ethylhexyl acrylate), and the like), an acrylic acid ester co-polymer, a methacrylic acid derivative polymer, a methacrylic acid homopolymer, a methacrylic acid ester homopolymer (e.g., poly(methyl methacrylate), poly(butyl methacrylate), poly(2-ethylhexyl methacrylate), and the like), an acrylamido-methyl-propane sulfonate polymer, an acrylamido-methyl-propane sulfonate derivative polymer, an acrylamido-methyl-propane sulfonate co-polymer, an acrylic acid/acrylamido-methyl-propane sulfonate co-polymer, and any combination thereof. As used herein, the term "derivative" refers to any compound that is made from one of the listed compounds, for example, by replacing one atom in one of the listed compounds with another atom or group of atoms, ionizing one of the listed compounds, or creating a salt of one of the listed compounds.

Aqueous tackifying agents may comprise at least one member selected from the group consisting of benzyl coco di-(hydroxyethyl) quaternary amine, p-T-amyl-phenol condensed with formaldehyde, and a copolymer comprising from about 80% to about 100% $C_1$-$C_{30}$ alkylmethacrylate monomers and from about 0% to about 20% hydrophilic monomers. In some embodiments, the aqueous tackifying agent may comprise a copolymer that comprises from about 90% to about 99.5% 2-ethylhexylacrylate and from about 0.5% to about 10% acrylic acid. The term "copolymer," as used herein, is not limited to polymers comprising two types of monomeric units, but includes any combination of monomeric units, e.g., terpolymers, tetrapolymers, and the like.

Suitable hydrophillic monomers may be any monomer that will provide polar oxygen-containing or nitrogen-containing groups. Suitable hydrophillic monomers may include, but are not limited to, dialkyl amino alkyl (meth)acrylates and their quaternary addition and acid salts, acrylamide, N-(dialkyl amino alkyl) acrylamide, methacrylamides and their quaternary addition and acid salts, hydroxy alkyl (meth)acrylates, unsaturated carboxylic acids such as methacrylic acid or acrylic acid, hydroxyethyl acrylate, acrylamide, and the like. Combinations of these may be suitable as well. These copolymers can be made by any suitable emulsion polymerization technique.

Resins suitable for use as a consolidating agent of the embodiments of the present disclosure may include any resin capable of forming a hardened, consolidated mass. Many such resins are commonly used in subterranean operations, and some suitable resins may include, but are not limited to, two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, silicon-based resins, polyester resins and hybrids and copolymers thereof, polyurethane resins and hybrids and copolymers thereof, acrylate resins, silicon-based resins, and any combination thereof.

Some suitable resins, such as epoxy resins, may be cured with an internal catalyst or activator so that when pumped down hole, they may be cured using only time and temperature. Other suitable resins, such as furan resins generally require a time-delayed catalyst or an external catalyst to help activate the polymerization of the resins if the cure temperature is low (i.e., less than about 121° C. (about 250° F.), but will cure under the effect of time and temperature if the formation temperature is above about 121° C. (about 250° F.), preferably above about 149° C. (about 300° F.). It is within the ability of one skilled in the art, with the benefit of this disclosure, to select a suitable resin for use in embodiments of the present disclosure and to determine whether a catalyst is required to trigger curing. By way of example, a silicon-based resin system as may be used as a more eco-friendly choice in cases where epoxy or furan-based resins pose environmental concerns.

Any solvent that is compatible with the resin and achieves the desired viscosity effect is suitable for use in the embodiments of the present disclosure. Suitable solvents may include, but are not limited to, butyl lactate, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d'limonene, fatty acid methyl esters, and butylglycidyl ether, and any combination thereof. Other solvents may include, but are not limited to, aqueous dissolvable solvents such as, methanol, isopropanol, butanol, and glycol ether solvents, and combinations thereof. Suitable glycol ether solvents may include, but are not limited to, diethylene glycol methyl ether, dipropylene glycol methyl ether, 2-butoxy ethanol, ethers of a C2 to C6 dihydric alkanol containing at least one C1 to C6 alkyl group, mono ethers of dihydric alkanols, methoxypropanol, butoxyethanol, and hexoxyethanol, and isomers thereof. Selection of an appropriate solvent is dependent on the resin composition chosen and is within the ability of one skilled in the art, with the benefit of this disclosure. It is within the ability of one skilled in the art, with the benefit of this disclosure, to determine whether and how much solvent is needed to achieve a suitable viscosity.

Suitable silyl-modified polyamide compounds that may be used as a consolidating agent in the embodiments of the present disclosure are those that are substantially self-hardening compositions capable of at least partially adhering to a surface of a formation face or particulate in an unhardened state, and that are further capable of self-hardening into a substantially non-tacky state to which individual particulates such as formation fines will not adhere to. Such silyl-modified polyamides may be based, for example, on the reaction product of a silating compound with a polyamide or a combination of polyamides. The polyamide or combination of polyamides may be one or more polyamide intermediate compounds obtained, for example, from the reaction of a polyacid (e.g., diacid or higher) with a polyamine (e.g., diamine or higher) to form a polyamide polymer with the elimination of water.

In other embodiments, the consolidating agent comprises crosslinkable aqueous polymer compositions. Generally, suitable crosslinkable aqueous polymer compositions comprise an aqueous solvent, a crosslinkable polymer, and a crosslinking agent. Such compositions are similar to those used to form gelled treatment fluids, such as fracturing fluids, but according to the methods of the embodiments of the present disclosure, they are not exposed to breakers or de-linkers, and so they retain their viscous nature over time. The aqueous solvent may be any aqueous solvent in which the crosslinkable composition and the crosslinking agent may be dissolved, mixed, suspended, or dispersed to facilitate gel formation. For example, the aqueous solvent used may be freshwater, salt water, brine, seawater, or any other aqueous liquid that does not adversely react with the other components used in accordance with this disclosure or with the subterranean formation.

Examples of crosslinkable aqueous polymer compositions for use as the consolidating agents described herein may include, but are not limited to, carboxylate-containing polymers and acrylamide-containing polymers. The most suitable polymers are thought to be those that would absorb or adhere to the formation or particulate surfaces. Examples of suitable acrylamide-containing polymers include polyacrylamide, partially hydrolyzed polyacrylamide, copolymers of acrylamide and acrylate, carboxylate-containing terpolymers, tetrapolymers of acrylate, and any combination thereof. Additional examples of suitable crosslinkable aqueous polymers may include, but are not limited to, hydratable polymers comprising polysaccharides and derivatives thereof, and that contain one or more of the monosaccharide units: galactose, mannose, glucoside, glucose, xylose, arabinose, fructose, glucuronic acid, or pyranosyl sulfate. Suitable natural hydratable polymers may include, but are not limited to, guar gum, locust bean gum, tara gum, konjak, tamarind, starch, cellulose, karaya, xanthan, tragacanth, and carrageenan, any derivative thereof, and any combination thereof.

Suitable hydratable synthetic polymers and copolymers that may be used as the crosslinkable aqueous polymer compositions may include, but are not limited to, polycarboxylates (e.g., polyacrylates and polymethacrylates), polyacrylamides, methylvinyl ether polymers, polyvinyl alcohols, polyvinylpyrrolidone, any derivative thereof, and any combination thereof. The crosslinkable polymer used should be included in the crosslinkable aqueous polymer composition in an amount sufficient to form the desired gelled substance in the subterranean formation. In some embodiments, the crosslinkable polymer may be included in the crosslinkable aqueous polymer composition in an amount in the range of from a lower limit of about 1%, 2%, 3%, 4%, 5%, 6%, 7%, 8%, 9%, 10%, 11%, 12%, 13%, 14%, and 15% to an upper limit of about 30%, 29%, 28%, 27%, 26%, 25%, 24%, 23%, 22%, 21%, 20%, 19%, 18%, 17%, 16%, and 15% by weight of the aqueous solvent, encompassing any value and subset therebetween. In another embodiment, the crosslinkable polymer may be included in the crosslinkable aqueous polymer composition in an amount in the range of from about 1% to about 20% by weight of the aqueous solvent.

The crosslinkable aqueous polymer compositions of the embodiments described herein further comprise a crosslinking agent for crosslinking the crosslinkable polymers to form the desired gelled substance. In some embodiments, the crosslinking agent is a molecule or complex containing a reactive transition metal cation. In some embodiments, the crosslinking agent may comprise trivalent chromium cations complexed or bonded to anions, atomic oxygen, or water. Examples of suitable crosslinking agents may include, but are not limited to, compounds or complexes containing chromic acetate and/or chromic chloride. Other suitable transition metal cations may include, but are not limited to, chromium VI within a redox system, aluminum III, iron II, iron III, and zirconium IV. Combinations of these crosslinking agents may also be suitable.

The crosslinking agent may be present in the crosslinkable aqueous polymer compositions of the embodiments of the present disclosure in an amount sufficient to provide, among other things, the desired degree of crosslinking. In some embodiments, the crosslinking agent may be present in the crosslinkable aqueous polymer compositions in an amount in the range of from a lower limit of about 0.01%, 0.025%, 0.05%, 0.075%, 0.1%, 0.25%, 0.5%, 0.75%, 1%, 1.25%, 1.5%, 1.75%, 2%, and 2.25% to an upper limit of about 5%, 4.75%, 4.5%, 4.25%, 4%, 3.75%, 3.5%, 3.25%, 3%, 2.75%, 2.5%, and 2.25% by weight of the crosslinkable aqueous polymer composition, encompassing any value and subset therebetween. The exact type and amount of crosslinking agent or agents used depends upon the specific crosslinkable polymer to be crosslinked, formation temperature conditions, and the like.

Optionally, the crosslinkable aqueous polymer compositions may further comprise a crosslinking delaying agent, such as a polysaccharide crosslinking delaying agent derived from guar, guar derivatives, cellulose derivatives, or combinations thereof. The crosslinking delaying agent may be included in the crosslinkable aqueous polymer compositions, among other things, to delay crosslinking of the crosslinkable aqueous polymer compositions until desired.

In other embodiments, the consolidating agent may comprise polymerizable organic monomer compositions. Generally, suitable polymerizable organic monomer compositions comprise an aqueous fluid, a water-soluble polymerizable organic monomer, an oxygen scavenger, and a primary initiator.

The aqueous fluid component of the polymerizable organic monomer composition generally may be freshwater, salt water, brine, seawater, or any other aqueous liquid that does not adversely react with the other components used in accordance with this disclosure or with the subterranean formation.

A variety of monomers may be suitable for use as the water-soluble polymerizable organic monomers in the embodiments of the present disclosure. Examples of suitable monomers may include, but are not limited to, acrylic acid, methacrylic acid, acrylamide, methacrylamide, 2-methacrylamido-2-methylpropane sulfonic acid, dimethylacrylamide, vinyl sulfonic acid, N,N-dimethylaminoethylmethacrylate, 2-triethylammoniumethylmethacrylate chloride, N,N-dimethyl-aminopropylmethacryl-amide, methacrylamidepropyltriethylammonium chloride, N-vinyl pyrrolidone, vinylphosphonic acid, and methacryloyloxyethyl trimethylammonium sulfate, and any combination thereof. In some embodiments, the water-soluble polymerizable organic monomer should be self-crosslinking. Examples of suitable monomers which are thought to be self-crosslinking may include, but are not limited to, hydroxyethylacrylate, hydroxymethylacrylate, hydroxyethylmethacrylate, N-hydroxymethylacrylamide, N-hydroxymethyl-methacrylamide, polyethylene amine, polyethylene glycol acrylate, polyethylene glycol methacrylate, polypropylene glycol acrylate, and polypropylene glycol methacrylate, and any combination thereof. Of these, hydroxyethylacrylate may be preferred in some instances. An example of a particularly suitable monomer is hydroxyethylcellulose-vinyl phosphoric acid.

The water-soluble polymerizable organic monomer (or monomers where a combination thereof is used) should be included in the polymerizable organic monomer composition in an amount sufficient to form the desired gelled substance after placement on the particulates described herein. In some embodiments, the water-soluble polymerizable organic monomer may be included in the polymerizable organic monomer composition in an amount in the range of from a lower limit of about 1%, 2%, 4%, 6%, 8%, 10%, 12%, 14%, and 16% to an upper limit of about 30%, 28%, 26%, 24%, 22%, 20%, 18%, and 16% by weight of the aqueous fluid, encompassing any value and any subset therebetween. In another embodiment, the water-soluble polymerizable organic monomer may be included in the polymerizable organic monomer composition in an amount in the range of from about 1% to about 20% by weight of the aqueous fluid.

The presence of oxygen in the polymerizable organic monomer composition may inhibit the polymerization process of the water-soluble polymerizable organic monomer or monomers. Therefore, an oxygen scavenger, such as stannous chloride, may be included in the polymerizable monomer composition. In order to improve the solubility of stannous chloride so that it may be readily combined with the polymerizable organic monomer composition, the stannous chloride may be pre-dissolved in a hydrochloric acid solution. For example, the stannous chloride may be dissolved in about a 0.1% by weight aqueous hydrochloric acid solution in an amount of about 10% by weight of the resulting solution. The resulting stannous chloride-hydrochloric acid solution may be included in the polymerizable organic monomer composition in an amount in the range of from a lower limit of about 0.005%, 0.01%, 0.1%, 0.5%, 1%, 1.5%, 2%, 2.5%, 3%, 3.5%, 4%, and 4.5% to an upper limit about 10%, 9.5%, 9%, 8.5%, 8%, 7.5%, 7%, 6.5%, 6%, 5.5%, 5%, and 4.5% by weight of the polymerizable organic monomer composition, encompassing any value and any subset therebetween. Generally, the stannous chloride may be included in the polymerizable organic monomer composition of the embodiments of the present disclosure in an amount in the range of from about 0.005% to about 0.1% by weight of the polymerizable organic monomer composition.

A primary initiator may be used, among other things, to initiate polymerization of the water-soluble polymerizable organic monomer(s). Any compound or compounds that form free radicals in aqueous solution may be used as the primary initiator. The free radicals may act, among other things, to initiate polymerization of the water-soluble polymerizable organic monomer present in the polymerizable organic monomer composition. Compounds suitable for use as the primary initiator may include, but are not limited to, alkali metal persulfates, peroxides, oxidation-reduction systems employing reducing agents (e.g., sulfites in combination with oxidizers), azo polymerization initiators, and any combination thereof. Suitable azo polymerization initiators may include, but are not limited to, 2,2'-azobis(2-imidazole-2-hydroxyethyl) propane, 2,2'-azobis(2-aminopropane), 4,4'-azobis(4-cyanovaleric acid), 2,2'-azobis(2-methyl-N-(2-hydroxyethyl) propionamide, and any combination thereof. Generally, the primary initiator should be present in the polymerizable organic monomer composition in an amount sufficient to initiate polymerization of the water-soluble polymerizable organic monomer(s). In certain embodiments, the primary initiator may be present in the polymerizable organic monomer composition in an amount in the range of from a lower limit of about 0.1%, 0.2%, 0.4%, 0.6%, 0.8%, 1%, 1.2%, 1.4%, 1.6%, 1.8%, 2%, 2.2%, 2.4%, and 2.6% to an upper limit of about 5%, 4.8%, 4.6%, 4.4%, 4.2%, 4%, 3.8%, 3.6%, 3.4%, 3.2%, 3%, 2.8%, and 2.6% by weight of the water-soluble polymerizable organic monomer(s), encompassing any value and any subset therebetween. One skilled in the art, with the benefit of this disclosure, will recognize that as the polymerization temperature increases, the required level of activator decreases.

Optionally, the polymerizable organic monomer compositions further may comprise a secondary initiator. A secondary initiator may be used, for example, where the polymerizable organic monomer composition is placed into a subterranean formation that is relatively cool as compared to the surface, such as when placed below the mud line in offshore operations. The secondary initiator may be any suitable water-soluble compound or compounds that may react with the primary initiator to provide free radicals at a lower temperature. An example of a suitable secondary initiator is triethanolamine. In some embodiments, the secondary initiator is present in the polymerizable organic monomer composition in an amount in the range of from a lower limit of about 0.1%, 0.2%, 0.4%, 0.6%, 0.8%, 1%, 1.2%, 1.4%, 1.6%, 1.8%, 2%, 2.2%, 2.4%, and 2.6% to an upper limit of about 5%, 4.8%, 4.6%, 4.4%, 4.2%, 4%, 3.8%, 3.6%, 3.4%, 3.2%, 3%, 2.8%, and 2.6% by weight of the water-soluble polymerizable organic monomer(s), encompassing any value and any subset therebetween.

Also optionally, the polymerizable organic monomer compositions of the embodiments of the present disclosure may further comprise a crosslinker for crosslinking the polymerizable organic monomer compositions (e.g., into a gelled substance). In some embodiments, the crosslinker may be any crosslinker capable of crosslinking the polymerizable organic monomer composition that does not adversely interfere with the components of the treatment fluids described herein. Examples of suitable crosslinking agents include those discussed previously with reference to crosslinkable aqueous polymer compositions. Generally, the crosslinker may be present in polymerizable organic monomer compositions in an amount in the range of from a lower limit of about 0.01%, 0.02%, 0.04%, 0.06%, 0.08%, 0.1%, 0.2%, 0.4%, 0.6%, 0.8%, 1%, 1.2%, 1.4%, 1.6%, 1.8%, and 2% to an upper limit of about 5%, 4.8%, 4.6%, 4.4%, 4.2%, 4%, 3.8%, 3.6%, 3.4%, 3.2%, 3%, 2.8%, 2.6%, 2.4%, 2.2%, and 2% by weight of the polymerizable organic monomer composition, encompassing any value and any subset therebetween.

In some embodiments, the consolidating agent may comprise a binder. Suitable binders may generally comprise 1) a hydrolysate or heterocondensate of at least one hydrolysable silicon compound and at least one metal, phosphorus or boron compound, the metal being selected from Al, Ge, Sn, Pb, Ti, Mg, Li, V, Nb, Ta, Zr and Hf; 2) an organic polymerizable or polycondensable monomer or oligomer; and, 3) a buffer, so that the pH of the buffered binder is in the range from 2 to 7, and optionally a complexing agent, if appropriate, the at least one hydrolysable silicon compound comprising one or more hydrolysable silicon compounds having at least one nonhydrolysable group or oligomers thereof. Such binders are suitable for consolidating bulk or loose substrates.

Other binders suitable for using the embodiments of the present disclosure may generally comprise:

(I) a consolidant comprising a hydrolyzate or precondensate of:

(a) at least one organosilane of the general Formula IV:

RnSiX4-n           Formula IV in which the R radicals are the same or different and are each hydrolytically non-removable groups, the X radicals are the same or different and are each hydrolytically removable groups or hydroxyl groups and n is 1, 2 or 3, (b) optionally at least one hydrolyzable silane of the general Formula V:

SiX4           Formula V in which the X radicals are each as defined above, and (c) at least one metal compound of the general Formula VI:

MXa           Formula VI in which M is a metal of main groups I to VIII or of transition groups II to VIII of the Periodic Table of the Elements including boron, X is as defined in Formula IV, where two X groups may be replaced by one oxo group, and a corresponds to the valence of the element, where the molar ratio of silicon compounds used to metal compounds used is in the range from 8000:1 to 8:1, is infiltrated or injected into the geological formation and, (II) the consolidating agent is cured under elevated pressure and elevated temperature, where the consolidating agent, in the case that it is used to change the wetting behavior of the formation, also comprises an oleophobic and hydrophobic component. Comprehensive investigations have shown that these consolidating agents are not decomposed even in autoclaves at high pressure and high temperature even over a prolonged period, and also still form a stable bond under these conditions. In the case of use of a wetting-regulating consolidating agent variant, it was shown that the wetting behavior established is retained after a hydrothermal treatment in corrosive medium. The consolidation also reduces the porosity only to a slight degree.

Suitable silicon-based resins for use as the consolidating agents described herein may include polysiloxanes, which are liquid substances having low viscosity, excellent curing workability, and excellent heat resistance once cured. Suitable polysiloxanes may be obtained by hydrolysis and polycondensation of a silicon compound having three hydrolyzable groups, a silicon compound having two hydrolyzable groups and a silicon compound having one hydrolyzable group. Suitable polysiloxanes have a hydrosilylatable carbon-carbon unsaturated group, a hydrosilyl group (a group containing Si—H bond) and an alkoxysilyl group, and have a number-average molecular weight of 500 to 20,000, and that is obtained by conducting a hydrolysis and polycondensation reaction of a silicon compound (T) having three hydrolyzable groups, a silicon compound (D) having two hydrolyzable groups, and a silicon compound (M) having one hydrolyzable group. The polysiloxane of the embodiments of the present disclosure may be a compound that has a silsesquioxane unit (hereinafter referred to as a "structural unit T") deriving from the silicon compounds (T), (D) and (M), a silicone unit (hereinafter referred to as a "structural unit D"), and a monofunctional siloxane unit (hereinafter referred to as a "structural unit M").

At least one compound of the silicon compound (T), the silicon compound (D), and the silicon compound (M) has a hydrosilyl group among the silicon compounds (T), (D) and (M), and at least one compound of the silicon compound (T), the silicon compound (D), and the silicon compound (M) has a hydrosilylatable carbon-carbon unsaturated group. This unsaturated group usually binds to a silicon atom and is an organic group having carbon atoms of 2 to 10 containing a double bond or a triple bond. Specific examples of the unsaturated group may include, but are not limited to, a vinyl group, an ortho styryl group, a meta styryl group, a para styryl group, an acryloyl group, a methacryloyl group, an acryloxy group, a methacryloxy group, a 1-propenyl group, a 1-butenyl group, a 1-pentenyl group, a 3-methyl-1-butenyl group, a phenylethenyl group, an ethynyl group, a 1-propynyl group, a 1-butynyl group, a 1-pentinyl group, a 3-methyl-1-butynyl group, a phenylbutynyl group, and the like, and any combination thereof.

The silicon compound having the unsaturated group may have only one unsaturated group or two or more unsaturated groups. In the case where the compound has two or more unsaturated groups, the unsaturated groups may be the same or different from each other. Additionally, the two or more unsaturated groups may be bound to the same silicon atom or to a plurality of silicon atoms. It is noted that when a polysiloxane obtained using a silicon compound in which the unsaturated group is bound to the same silicon atom is subjected to curing, an unreacted vinyl group may easily remain due to steric hindrance, and heat resistance might become insufficient. Therefore, the silicon compound having the unsaturated group is preferably a compound in which one unsaturated group is bound to one silicon atom.

Other suitable silicon-based resins include (a) a compound comprising a reactive group of Formula I:

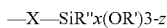    Formula I wherein X comprises a hydrocarbon chain; wherein x=0 to 2 and z=0 to 2; wherein R' and R" comprises hydrogen, a halogen, an amide, an amide, a hydrocarbon chain, carboxy (e.g., acetoxy), alkoxy (e.g., ethoxy, methoxy), a hydrocarbon chain comprising a heteroatom, and/or a hydrocarbon chain comprising a carbonyl group; and wherein when x is 2, then each R" may be the same (identical) or different; and wherein when z is 0 or 1, then each R' may be the same or different;

and, (b) a polysiloxane comprising a reactive functional group that comprises at least one of the following structural units of Formula II:

    Formula II wherein R1 comprises hydrogen, hydroxyl, a hydrocarbon chain, or a siloxane chain; wherein R2 comprises a functional group; and wherein m and n fulfill the requirements of 0<n<4, 0<m<4 and 2<(m+n)<4; and wherein when n>1, then each R1 may be the same or different; and wherein when m>1, then each R2 may be the same or different. In certain embodiments, the functional group of R2 comprises hydroxyl, carboxyl, isocyanate, blocked (poly)isocyanate, primary amine, secondary amine, amide, carbamate, urea, urethane, vinyl, unsaturated ester, maleimide, fumarate, anhydride, hydroxyl alkylamide, epoxy, or combinations thereof.

Other suitable silicon-based resins may include a compound comprising an organofunctional polysiloxane polymer as a binding resin obtaining the polymeric structure as part of a curing mechanism or a combination thereof. The curing mechanism of such siloxane coatings is a two-step mechanism. First, a hydrolysable group attached to the silicon atom is split off in a reaction with water, to form a silanol. The silanol then reacts with another silanol in a condensation reaction to form a silicon-oxygen-silicon chemical bonding which is characteristic for siloxane coatings. The hydrolysable group can be a halogen, ketoxime or acetoxy groups, but the most common is alkoxy group. Suitable such silicon-based resins comprise:

a) a polysiloxane having the following Formula III:

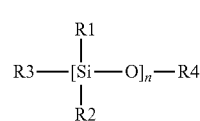    Formula III wherein, for each repeating polymer unit, R1, R2 and R3 are independently selected from the group consisting of alkyl, aryl, reactive glycidoxy groups having up to 20 carbon atoms, and OSi(OR5)3 groups, wherein each R5 independently has the same meaning as R1, R2 or R3, and R4 is either alkyl, aryl or hydrogen, and wherein n is selected such that the molecular weight of the polysiloxane is in the range of 500 to 2000; and, b) an organo functional silane with two hydrolysable groups having the formula wherein R1 is selected from the group consisting of alkyl, aryl, reactive glycidoxy, amino, mercapto, vinyl, isocyanate or methacrylate groups having up to 20 carbon atoms; R2 is selected from the group consisting of reactive glycidoxy, amino, mercapto, vinyl, isocyanate or methacrylate groups having up to 20 carbon atoms; and R3 and R4 are halogen or alkoxy, ketoxime or acetoxy groups having up to six carbon atoms; wherein the coating composition has a solids content of at least 60% by weight.

Still other suitable silicon-based resins may comprise a silane coupling agent and a polymer having a reactive silicon end group. In some embodiments, these suitable silicon-based resins may also include a catalyst operable to facilitate the curing of the polymer, a diluent, a dehydrating agent, and/or a filler material. Generally, any suitable polymer that can be prepared with reactive silicon end groups may be used. Examples of suitable polymers may include, but are not limited to, a polyalkyl (e.g., polyethers, polyalkanes, polyalkenes, polyalkynes, and the like), a substituted alkyl monomer (e.g., styrene), an acrylic, and any combination thereof. Examples of suitable reactive silicon end groups may include, but are not limited to, triethoxysilanes, methyldiethoxysilanes, trisilanols, alkoxysilanes, substituted silanes, multi-silanols, and any combination thereof. One suitable polymer having a reactive silicon end group that may be used in particular embodiments of the present disclosure is a silane-modified poly(propylene oxide) oligomer.

Generally, any suitable silane coupling agent may be used in accordance with particular embodiments of the present disclosure. Examples of suitable silane coupling agents may include, but are not limited to, N-2-(aminoethyl)-3-aminopropyltrimethoxysilane, 3-glycidoxypropyltrimethoxysilane, gamma-aminopropyltriethoxysilane, N-beta-(aminoethyl)-gamma-aminopropyltrimethoxysilanes, aminoethyl-N-beta-(aminoethyl)-gamma-aminopropyl-trimethoxysilanes, gamma-ureidopropyl-triethoxysilanes, beta-(3-4 epoxy-cyclohexyl)-ethyl-trimethoxysilane, gamma-glycidoxypropyltrimethoxysilane, vinyltrichlorosilane, vinyltris (beta-methoxyethoxy) silane, vinyltriethoxysilane, vinyltrimethoxysilane, 3-metacryloxypropyltrimethoxysilane, beta-(3,4 epoxycyclohexyl)-ethyltrimethoxysilane, r-glycidoxypropyltrimethoxysilane, r-glycidoxypropylmethylidiethoxysilane, N-beta-(aminoethyl)-r-aminopropyl-trimethoxysilane, N-beta-(aminoethyl)-r-aminopropylmethyldimethoxysilane, 3-aminopropyl-triethoxysilane, N-phenyl-r-aminopropyltrimethoxysilane, r-mercaptopropyltrimethoxysilane, r-chloropropyltrimethoxysilane, vinyltris (beta-methoxyethoxy) silane, r-metacryloxypropyltrimethoxysilane, r-glycidoxypropyltrimethoxysilane, r-glycidoxypropylmethylidiethoxysilane, N-beta-(aminoethyl)-r-aminopropyltrimethoxysilane, N-beta-(aminoethyl)-r-aminopropylmethyldimethoxysilane, r-aminopropyltriethoxysilane, N-[3-(trimethoxysilyl)propyl]-ethylenediamine, substituted silanes where one or more of the substitutions contains a different functional group, and any combination thereof.

In some embodiments, the silane coupling agent may be present in the silicon-based resin composition in an amount of from a lower limit of about 0.1%, 0.2%, 0.3%, 0.4, 0.5%, 0.6%, 0.7%, 0.8%, 0.9%, 1%, 1.1%, 1.2%, 1.3%, 1.4%, 1.5%, 1.6%, 1.7%, 1.8%, 1.9%, 2%, 2.1%, 2.2%, 2.3%, 2.4%, and 2.5% to an upper limit of about 5%, 4.9%, 4.8%, 4.7%, 4.6%, 4.5%, 4.4%, 4.3%, 4.2%, 4.1%, 4%, 3.9%, 3.8%, 3.7%, 3.6%, 3.5%, 3.4%, 3.3%, 3.2% 3.1%, 3%, 2.9%, 2.8%, 2.7%, 2.6%, and 2.5% by weight of the composition, and preferably in an amount from about 0.5% to about 3% by weight of the composition, encompassing any value and any subset therebetween.

In some embodiments, the consolidating agent may comprise a zeta potential-modifying aggregating composition, which can modify the zeta potential or aggregation potential of a surface. Such modifications can permit any two surfaces (e.g., of particulates, of a particulate and a substrate, etc.) to have a greater attraction for one another.

Zeta potential-modifying aggregating compositions suitable for use in the embodiments of the present disclosure may include, but are not limited to, a reaction product of an amine and a phosphate ester, where the zeta potential-modifying aggregating composition is designed to coat a surface (e.g., a formation face or particulates) to change the zeta potential or aggregation potential of the surface.

Suitable amines may include, but are not limited to, any amine that is capable of reacting with a suitable phosphate ester to form a composition that forms a deformable coating on a surface. Exemplary examples of such amines may include, but are not limited to, any amine of the general formula $R_1, R_2 NH$ or mixtures or combinations thereof, where $R_1$ and $R_2$ are independently a hydrogen atom or a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur, and any combination thereof and where one or more of the hydrogen atoms can be replaced by one or more single valence atoms selected from the group consisting of fluorine, chlorine, bromine, iodine, and any combination thereof. Exemplary examples of amines suitable for use in the embodiments herein may include, but are not limited to, aniline and alkyl anilines or mixtures of alkyl anilines, pyridines and alkyl pyridines or mixtures of alkyl pyridines, pyrrole and alkyl pyrroles or mixtures of alkyl pyrroles, piperidine and alkyl piperidines or mixtures of alkyl piperidines, pyrrolidine and alkyl pyrrolidines or mixtures of alkyl pyrrolidines, indole and alkyl indoles or mixtures of alkyl indoles, imidazole and alkyl imidazole or mixtures of alkyl imidazole, quinoline and alkyl quinoline or mixtures of alkyl quinoline, isoquinoline and alkyl isoquinoline or mixtures of alkyl isoquinoline, pyrazine and alkyl pyrazine or mixtures of alkyl pyrazine, quinoxaline and alkyl quinoxaline or mixtures of alkyl quinoxaline, acridine and alkyl acridine or mixtures of alkyl acridine, pyrimidine and alkyl pyrimidine or mixtures of alkyl pyrimidine, quinazoline and alkyl quinazoline or mixtures of alkyl quinazoline, and any combination thereof.

Suitable phosphate esters may include, but are not limited to, any phosphate ester that is capable of reacting with a suitable amine to form a composition that forms a deformable coating on a surface. Exemplary examples of such phosphate esters may include, but are not limited to, any phosphate esters of the general formula $P(O)(OR3)(OR4)(OR5)$ or mixtures or combinations thereof, where R3, R4, and OR5 are independently a hydrogen atom or a carbyl group having between about 1 and 40 carbon atoms, and the required hydrogen atoms to satisfy the valence and where one or more of the carbon atoms can be replaced by one or more hetero atoms selected from the group consisting of boron, nitrogen, oxygen, phosphorus, sulfur, and any combination thereof; and where one or more of the hydrogen atoms can be replaced by one or more single valence atoms selected from the group consisting of fluorine, chlorine, bromine, iodine, and any combination thereof. Exemplary examples of phosphate esters may include, but are not limited to, phosphate ester of alkanols having the general formula $P(O)(OH)x(OR6)y$ where $x+y=3$ and are independently a hydrogen atom or a carbyl group having between about 1 and 40 carbon atoms, and the required hydrogen atoms to satisfy the valence and where one or more of the carbon atoms can be replaced by one or more hetero atoms selected from the group consisting of boron, nitrogen, oxygen, phosphorus, sulfur, and any combination thereof; and where one or more of the hydrogen atoms can be replaced by one or more single valence atoms selected from the group consisting of fluorine, chlorine, bromine, iodine or mixtures or combinations thereof such as ethoxy phosphate, propoxyl phosphate or higher alkoxy phosphates, and any combination thereof.

Other exemplary examples of phosphate esters may include, but are not limited to, phosphate esters of alkanol amines having the general formula N[R7OP(O)(OH)2]3 where R7 is a carbenyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur, and any combination thereof; and where one or more of the hydrogen atoms can be replaced by one or more single valence atoms selected from the group consisting of fluorine, chlorine, bromine, iodine or mixtures or combinations thereof group including the tri-phosphate ester of tri-ethanol amine, and any combination thereof. Other exemplary examples of phosphate esters may include, but are not limited to, phosphate esters of hydroxylated aromatics, such as phosphate esters of alkylated phenols such as nonylphenyl phosphate ester or phenolic phosphate esters. Other exemplary examples of phosphate esters may include, but are not limited to, phosphate esters of diols and polyols such as phosphate esters of ethylene glycol, propylene glycol, or higher glycolic structures. Other exemplary phosphate esters may include, but are not limited to, any phosphate ester that can react with an amine and be coated on to a surface that forms a deformable coating enhancing the aggregating potential of the surface.

In some embodiments, the consolidating agent may comprise a consolidating agent emulsion that comprises an aqueous fluid, an emulsifying agent, and a consolidating agent. The consolidating agent in suitable emulsions may be either a non-aqueous tackifying agent or a resin, such as those described above. These consolidating agent emulsions have an aqueous external phase and organic-based internal phase. The term "emulsion" and all grammatical variants thereof, as used herein, refers to a combination of two or more immiscible phases and includes, but is not limited to, dispersions and suspensions.

Suitable consolidating agent emulsions comprise an aqueous external phase comprising an aqueous fluid. Suitable aqueous fluids that may be used in the consolidating agent emulsions of the embodiments of the present disclosure include freshwater, salt water, brine, seawater, or any other aqueous fluid that, preferably, does not adversely react with the other components used in accordance with this disclosure or with the subterranean formation, including those listed above with reference to the aqueous base fluids included in the treatment fluids described herein. One should note, however, that if long-term stability of the emulsion is desired, a more suitable aqueous fluid may be one that is substantially free of salts. It is within the ability of one skilled in the art, with the benefit of this disclosure, to determine if and how much salt may be tolerated in the consolidating agent emulsions of the embodiments of the present disclosure before it becomes problematic for the stability of the emulsion.

The aqueous fluid may be present in the consolidating agent emulsions in an amount in the range of from a lower limit of about 20%, 22%, 24%, 26%, 28%, 30%, 32%, 34%, 36%, 38%, 40%, 42%, 44%, 46%, 48%, 50%, 52%, 54%, 56%, 58%, and 60% to an upper limit of about 99.9%, 98%, 96%, 94%, 92%, 90%, 88%, 86%, 84%, 82%, 80%, 78%, 76%, 74%, 72%, 70%, 68%, 66%, 64%, 62%, and 60% by weight of the consolidating agent emulsion composition, encompassing any value and any subset therebetween. In some embodiments, the aqueous fluid may be present in the consolidating agent emulsions in an amount in the range of about 60% to 99.9% by weight of the consolidating agent emulsion composition. In other embodiments, the aqueous fluid may be present in the consolidating agent emulsions in an amount in the range of about 95% to 99.9% by weight of the consolidating agent emulsion composition.

The consolidating agent in the emulsion may be either a non-aqueous tackifying agent or a resin, such as those described above. The consolidating agents may be present in a consolidating agent emulsion in an amount in the range of from a lower limit of about 0.1%, 1%, 5%, 10%, 15%, 20%, 25%, 30%, 35%, and 40% to an upper limit about 80%, 75%, 70%, 65%, 60%, 55%, 50%, 45%, and 40% by weight of the consolidating agent emulsion composition, encompassing any value and any subset therebetween. In some embodiments, the consolidating agent may be present in a consolidating agent emulsion in an amount in the range of about 0.1% to about 40% by weight of the composition. In some embodiments, the consolidating agent may be present in a consolidating agent emulsion in an amount in the range of about 0.1% to about 5% by weight of the composition.

In certain embodiments, the consolidating agent emulsions may further comprise an emulsifying agent. Examples of suitable emulsifying agents may include, but are not limited to, surfactants, proteins, hydrolyzed proteins, lipids, glycolipids, and nano-sized particulates, including, but not limited to, fumed silica. Combinations of these may be suitable as well.

In some embodiments, the consolidating agent may also comprise an optional catalyst to facilitate curing. Generally, any suitable catalyst may be used with the consolidating agent described herein. Examples of suitable catalysts may include, but are not limited to, tertiary amine catalysts, titanium chelate catalysts, tin catalysts, lead catalysts, bismuth catalysts, and any combination thereof. One suitable catalyst that may be used in particular embodiments of the present disclosure is dibutylbis(2,4-pentanedionate-O,O')—, (OC-6-11). In some embodiments, the catalyst may be present in an amount from about 0.1%, 0.2%, 0.3%, 0.4, 0.5%, 0.6%, 0.7%, 0.8%, 0.9%, 1%, 1.1%, 1.2%, 1.3%, 1.4%, 1.5%, 1.6%, 1.7%, 1.8%, 1.9%, 2%, 2.1%, 2.2%, 2.3%, 2.4%, and 2.5% to an upper limit of about 5%, 4.9%, 4.8%, 4.7%, 4.6%, 4.5%, 4.4%, 4.3%, 4.2%, 4.1%, 4%, 3.9%, 3.8%, 3.7%, 3.6%, 3.5%, 3.4%, 3.3%, 3.2% 3.1%, 3%, 2.9%, 2.8%, 2.7%, 2.6%, and 2.5% by weight of the consolidating agent, and preferably in an amount from about 1% to about 3% by weight of the composition, encompassing any value and any subset therebetween.

In some embodiments, the first or second treatment fluids of the present disclosure may further comprise a friction reducing agent. Friction reducing agents suitable for use in the treatment fluids described herein may, among other things, reduce energy losses when the treatment fluid is introduced into the subterranean formation due to friction between the treatment fluid in turbulent flow and the formation and/or tubular good(s) (e.g., a pipe, coiled tubing, etc.) disposed in the wellbore in the formation. In this regard, the use of a friction reducing agent in the treatment fluids described herein may transform the treatment fluids into slickwater. As used herein, the term "slickwater" refers to a low viscosity fluid (i.e., a viscosity of less than about 20 centipoise ("cP"), and preferably less than about 10 cP) containing friction reducing agents to modify the flow characteristics of the fluid.

Any friction reducing agent suitable for use in subterranean operations may be suitable for use in the treatment fluids described herein. Additionally, friction reducing agents suitable for use in the embodiments of the present disclosure may be polymers and/or copolymers. An example of a suitable friction reducing agent may comprise a quaternized aminoalkyl acrylate, such as a copolymer of acrylamide and dimethylaminoethyl acrylate quaternized with benzyl chloride. Other suitable friction reducing agents may include, but are not limited to, acrylamide (e.g., an acrylamide/acrylic acid copolymer), a polyethylene oxide, a polyvinyl polymer, a polymethacrylamide, a cellulose ether, a guar gum, diutan, wellan gum, a polysaccharide, a lignosulfonate, and any combination thereof. The friction reducing agents may further comprise additional monomers, such as 2-acrylamido-2-methylpropanesulfonic acid, N,N-dimethyl acrylamide, vinylsulfonic acid, N-vinyl acetamide, N-vinyl formamide, and any combination thereof. Combinations and derivatives of suitable friction reducing agents may also be suitable for use.

The friction reducing agents should have a molecular weight sufficient to provide a desired level of friction reduction. Generally, friction reducing agents having higher molecular weights may be needed to provide a desirable level of friction reduction. For example, in some embodiments, the average molecular weight of the friction reducing agents may be in the range of from a lower limit of about 7,500,000, 8,000,000, 8,500,000, 9,000,000, 9,5000,000, 10,000,000, 10,500,000, 11,000,000, 11,500,000, 12,000,000, 12,500,000, 13,000,000, and 13,500,000 to an upper limit of about 20,000,000, 19,500,000, 19,000,000, 18,500,000, 18,000,000, 17,500,000, 17,000,000, 16,500,000, 16,000,000, 15,500,000, 15,000,000, 14,500,000, 14,000,000, and 13,500,000, as determined using intrinsic viscosities, encompassing any value and subset therebetween.

The friction reducing agents may be included in the treatment fluids of the embodiments disclosed herein in an amount sufficient to provide the desired reduction of friction without forming a gel. Formation of a gel is dependent on a number of factors including the particular friction reducing agent used, concentration of the friction reducing agent, temperature, other additives in the treatment fluids, and the like. While the addition of friction reducing agents may minimally increase the viscosity of the treatment fluids, they are generally not included in the treatment fluids in an amount sufficient to substantially increase the viscosity. In treatment fluids comprising a gaseous base fluid, the friction reducer may be less desirable, although it may still be included, without departing from the scope of the present disclosure. In some embodiments, the friction reducing agent may be present in an amount in the range of from a lower limit of about 0.001%, 0.002%, 0.003%, 0.004%, 0.005%, 0.006%, 0.007%, 0.008%, 0.009%, 0.01%, 0.02%, 0.03%, 0.04%, 0.05%, 0.06%, 0.07%, 0.08%, 0.09%, 0.1%, 0.11%, 0.12%, 0.13%, 0.14%, 0.15%, 0.16%, 0.17%, 0.18%, 0.19%, 0.2%, 0.21%, 0.22%, 0.23%, 0.24%, and 0.25% to an upper limit of about 0.5%, 0.49%, 0.48%, 0.47%, 0.46%, 0.45%, 0.44%, 0.43%, 0.42%, 0.41%, 0.4%, 0.39%, 0.38%, 0.37%, 0.36%, 0.35%, 0.34%, 0.33%, 0.32%, 0.31%, 0.3%, 0.29%, 0.28%, 0.27%, 0.26%, and 0.25% by weight of the treatment fluid, encompassing any value and subset therebetween. In some embodiments, the friction reducing agent may be present in an amount in the range of from about 0.025% to about 0.25% by weight of the treatment fluid.

The friction reducing agents may be provided in any suitable form, including in a solid form, as an oil-external emulsion polymer, or as a component of a solution. In embodiments where a particular friction reducing agent is provided as an oil-external emulsion polymer, the oil-external emulsion polymer may comprise water, a water-immiscible liquid, an emulsifying surfactant, and a friction reducing agent. Suitable oil-external emulsion polymers may further comprise inhibitors, salts, and/or inverters.

In some embodiments, one or more of the treatment fluids of the present disclosure may additionally comprise an additive selected from the group consisting of a salt, a weighting agent, an inert solid, a fluid loss control agent, an emulsifier, a dispersion aid, a corrosion inhibitor, an emulsion thinner, an emulsion thickener, a surfactant, a particulate, a pH control additive, a breaker, a biocide, a stabilizer, a chelating agent, a scale inhibitor, a gas hydrate inhibitor, an oxidizer, a reducer, a clay stabilizing agent (e.g., an ammonium salt), and any combination thereof.

In various embodiments, systems configured for delivering the treatment fluids (collectively including each of the first and second treatment fluids) described herein to a downhole location are described. In various embodiments, the systems can comprise a pump fluidly coupled to a tubular, the tubular containing the treatment fluids described herein. It will be appreciated that while the system described below may be used for delivering either or both of the pad fluid and/or IMA treatment fluid, each treatment fluid is delivered separately into the subterranean formation.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluids to a subterranean formation at or above a fracture gradient of the subterranean formation, but it may also be used in cases where fracturing is not desired. In some embodiments, the high pressure pump may be capable of fluidly conveying particulate matter, such as the micro-proppant particulates and/or the micro-proppant particulates described in some embodiments herein, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluids to the high pressure pump. In such embodiments, the low pressure pump may "step up" the pressure of the treatment fluids before reaching the high pressure pump.

In some embodiments, the systems described herein can further comprise a mixing tank that is upstream of the pump and in which the treatment fluids are formulated. In various embodiments, the pump (e.g., a low pressure pump, a high pressure pump, or a combination thereof) may convey the treatment fluids from the mixing tank or other source of the treatment fluids to the tubular. In other embodiments, however, the treatment fluids may be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluids may be drawn into the pump, elevated to an appropriate pressure, and then introduced into the tubular for delivery downhole.

FIG. 1 shows an illustrative schematic of a system that can deliver the treatment fluids of the present disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which the treatment fluids of the embodiments herein may be formulated. The treatment fluids may be conveyed via line 12 to wellhead 14, where the treatment fluids enter tubular 16, tubular 16 extending from wellhead 14 into subterranean formation 18. Upon being ejected from tubular 16, the treatment fluids may subsequently penetrate into subterranean formation 18. Pump 20 may be configured to raise the pressure of the treatment fluids to a desired degree before introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

Embodiment A

A method comprising: introducing a first treatment fluid comprising a first base fluid and fly ash microspheres into a subterranean formation above a fracture gradient sufficient to create or enhance a first fracture network, wherein the first fracture network comprises a first main fracture and a first microfracture; placing the fly ash microspheres into the first microfracture, thereby forming at least a partial monolayer therein; introducing into the subterranean formation a second treatment fluid comprising a base fluid and proppant particulates above the fracture gradient; and placing the proppant particulates into the at least one first main fracture, thereby forming at least a partial monolayer therein.

Embodiment A may have one or more of the following additional elements in any combination:

Element A1: Wherein the fly ash microspheres are a material selected from the group consisting of Class C fly ash, Class F fly ash, and any combination thereof.

Element A2: Wherein the fly ash microspheres have a diameter in the range of from about 0.1 µm to about 150 µm.

Element A3: Wherein the fly ash microspheres are present in the first treatment fluid in an amount in the range of from about 0.001 ppg to about 1 ppg of the first treatment fluid.

Element A4: Wherein the proppant particulates are present in the second treatment fluid in an amount in the range of from about 0.1 ppg to about 12 ppg of the second treatment fluid.

Element A5: Wherein a consolidating agent is included in a fluid selected from the group consisting of the first treatment fluid, the second treatment fluid, and any combination thereof, the consolidating agent selected from the group consisting of a non-aqueous tackifying agent, an aqueous tackifying agent, a curable resin, a silyl-modified polyamide compound, a crosslinkable aqueous polymer composition, a polymerizable organic monomer composition, a binder, a silicon-based resin, a zeta potential-modifying aggregating composition, a consolidating agent emulsion, and any combination thereof.

Element A6: Wherein a consolidating agent is present in the fluid (the first and/or second treatment fluid) in an amount in the range of from about 0.01% to about 5% by volume of the fluid.

Element A7: Wherein a friction reducing agent is included in a fluid selected from the group consisting of the first treatment fluid, and second treatment fluid, and any combination thereof.

Element A8: Wherein the fly ash microspheres are metered (continuously or intermittently) into the first treatment fluid while the first treatment fluid is introduced into the subterranean formation.

Element A9: Further comprising a wellhead with a tubular extending therefrom and into the subterranean formation, and a pump fluidly coupled to the tubular, wherein a fluid selected from the group consisting of the first treatment fluid, the second treatment fluid, and any combination thereof is introduced into the subterranean formation through the tubular.

By way of non-limiting example, exemplary combinations applicable to Embodiment A include: A with A1 and A6; A with A2, A6, and A8; A with A3, A4, and A5; A with A7 and A9; A with A4, A8, and A9.

Embodiment B

A method comprising: introducing a first treatment fluid comprising a base fluid and coated fly ash microspheres into a subterranean formation above a fracture gradient sufficient to create or enhance a first fracture network, wherein the first fracture network comprises a first main fracture and a first microfracture, and wherein the coated fly ash microspheres comprise fly ash microspheres coated with a consolidating agent; placing the coated fly ash microspheres into the first microfracture, thereby forming at least a partial monolayer therein; introducing into the subterranean formation a second treatment fluid comprising a base fluid and proppant particulates above the fracture gradient; and placing the proppant particulates into the first main fracture, thereby forming at least a partial monolayer therein.

Embodiment B may have one or more of the following additional elements in any combination:

Element B1: Wherein the fly ash microspheres are a material selected from the group consisting of Class C fly ash, Class F fly ash, and any combination thereof.

Element B2: Wherein the fly ash microspheres have a diameter in the range of from about 0.1 µm to about 150 µm.

Element B3: Wherein the coated fly ash microspheres are present in the first treatment fluid in an amount in the range of from about 0.001 ppg to about 1 ppg of the first treatment fluid.

Element B4: Wherein the proppant particulates have a diameter in the range of from about 150 µm to about 1250 µm.

Element B5: Wherein the consolidating agent coating the fly ash microspheres is selected from the group consisting of a non-aqueous tackifying agent, an aqueous tackifying agent, a curable resin, a silyl-modified polyamide compound, a crosslinkable aqueous polymer composition, a polymerizable organic monomer composition, a binder, a silicon-based resin, a zeta potential-modifying aggregating composition, a consolidating agent emulsion, and any combination thereof.

Element B6: Wherein the proppant particulates are coated with a consolidating agent.

Element B7: Wherein the proppant particulates are coated with a consolidating agent selected from the group consisting of a non-aqueous tackifying agent, an aqueous tackifying agent, a curable resin, a silyl-modified polyamide compound, a crosslinkable aqueous polymer composition, a polymerizable organic monomer composition, a binder, a silicon-based resin, a zeta potential-modifying aggregating composition, a consolidating agent emulsion, and any combination thereof.

Element B8: Wherein a friction reducing agent is included in a fluid selected from the group consisting of the first treatment fluid, and second treatment fluid, and any combination thereof.

Element B9: Wherein the coated fly ash microspheres are metered (continuously or intermittently) into the first treatment fluid while the first treatment fluid is introduced into the subterranean formation.

Element B10: Further comprising a wellhead with a tubular extending therefrom and into the subterranean formation, and a pump fluidly coupled to the tubular, wherein a fluid selected from the group consisting of the first treatment fluid, the second treatment fluid, and any combination thereof is introduced into the subterranean formation through the tubular.

By way of non-limiting example, exemplary combinations applicable to Embodiment B include: B with B1 and B10; B with B9 and B10; B with B2, B3, and B6; B with B4 and B7; B with B2, B4, B5, and B9.

Embodiment C

A treatment fluid comprising: a base fluid; and fly ash microspheres, wherein the fly ash microspheres are of a material selected from the group consisting of Class C fly ash, Class F fly ash, and any combination thereof, wherein the fly ash microspheres have a diameter in the range of from about 0.1 µm to about 150 µm, and wherein the fly ash microspheres are present in the treatment fluid in an amount in the range of from about 0.001 ppg to about 1 ppg of the treatment fluid.

Embodiment C may have one or more of the following additional elements in any combination:

Element C1: Wherein a consolidating agent is included in the treatment fluid, the consolidating agent selected from the group consisting of a non-aqueous tackifying agent, an aqueous tackifying agent, a curable resin, a silyl-modified polyamide compound, a crosslinkable aqueous polymer composition, a polymerizable organic monomer composition, a binder, a silicon-based resin, a zeta potential-modifying aggregating composition, a consolidating agent emulsion, and any combination thereof.

Element C2: Wherein a consolidating agent is present in the treatment fluid in an amount in the range of from about 0.01% to about 5% by volume of the treatment fluid.

Element C3: Wherein the fly ash microspheres are coated with a consolidating agent.

Element C4: Wherein the fly ash microspheres are coated with a consolidating agent selected from the group consisting of a non-aqueous tackifying agent, an aqueous tackifying agent, a curable resin, a silyl-modified polyamide compound, a crosslinkable aqueous polymer composition, a polymerizable organic monomer composition, a binder, a silicon-based resin, a zeta potential-modifying aggregating composition, a consolidating agent emulsion, and any combination thereof.

Element C5: Wherein a friction reducing agent is included in the treatment fluid.

By way of non-limiting example, exemplary combinations applicable to Embodiment C include: C with C1 and C3; C with C4; C with C1; C with C2; C with C3; C with C4; C with C5; C with C2 and C5; C with C1, C2, C4, and C5.

To facilitate a better understanding of the embodiments of the present disclosure, the following examples of preferred or representative embodiments are given. In no way should the following examples be read to limit, or to define, the scope of the disclosure.

Example 1

In this example, the permeability of a fracture network was evaluated using consolidating agent coated fly ash microspheres described herein. Two shale core samples having a 2.54 centimeter ("cm") (1 inch ("in")) diameter and a 5.08 cm (2 in) length were obtained from outcrops of a shale formation. An artificial fracture network was created in each core by first using a DREMEL® tool to score an indention at the top of the core sample based on the samples natural fracture plane, followed by using a wide-blade chisel and hammer to axially split the core along the fracture plane into two halves.

Control Core 1 ("CC1") was prepared without the fly ash microspheres described herein. Each half of CC1 was immersed in a treatment fluid comprising 2% v/v of an ammonium salt-based organic clay stabilizing agent for 5 minutes ("min") at 60° C. (140° F.). Thereafter, each of the halves of CC1 were joined back together and places in a Hassler-type core holder to determine permeability of the core. The confining pressure was gradually increased to 1,200 psi and a backpressure of 200 psi was applied. The permeability was evaluated at 60° C. (140° F.) using nitrogen gas at three flow rates of 500 psi, 600 psi, and 700 psi, beginning with the highest flow rate.

Next Test Core 1 ("TC1") was prepared using a treatment fluid comprising fly ash microspheres and a consolidating agent. Each half of TC1 was first vertically immersed in a beaker comprising a pre-treatment fluid of 5% weight per volume ("w/v") potassium chloride aqueous base fluid, 5 pounds per 1,000 gallons ("lb/Mgal") guar gum friction reducing agent, 0.5% volume per volume ("v/v") polyamide consolidating agent. TC1 was immersed in the pre-treatment fluid for 10 min at 60° C. (140° F.) while the pre-treatment fluid was stirred at 700 rpm. Thereafter, the halves of TC1 were removed and immediately vertically immersed in a fly ash microsphere treatment fluid comprising 5% w/v potassium chloride aqueous base fluid, 5 lb/Mgal guar gum friction reducing agent, and 0.2 lb/gal Class C fly ash microspheres for 5 min at 60° C. (140° F.), while stirring at 700 rpm. Next, the halves of TC1 were joined back together and tested for permeability as described with reference to CC1 above.

Figure 2:
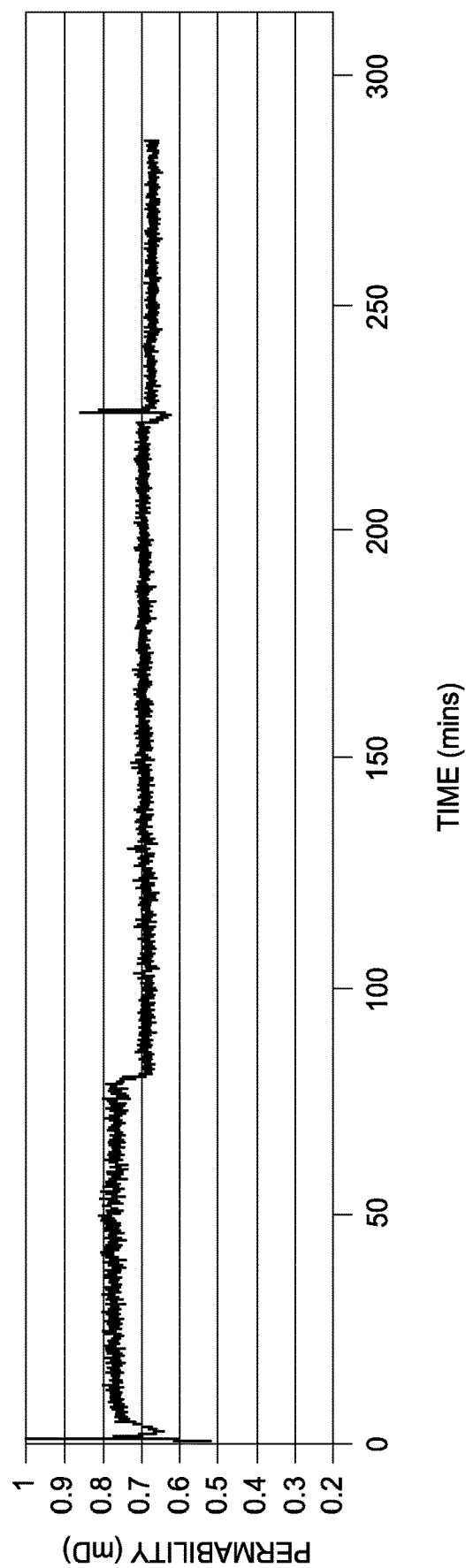
FIG. 2 depicts the permeability of a split shale core before treatment with the fly ash microspheres described herein.
Figure 3:
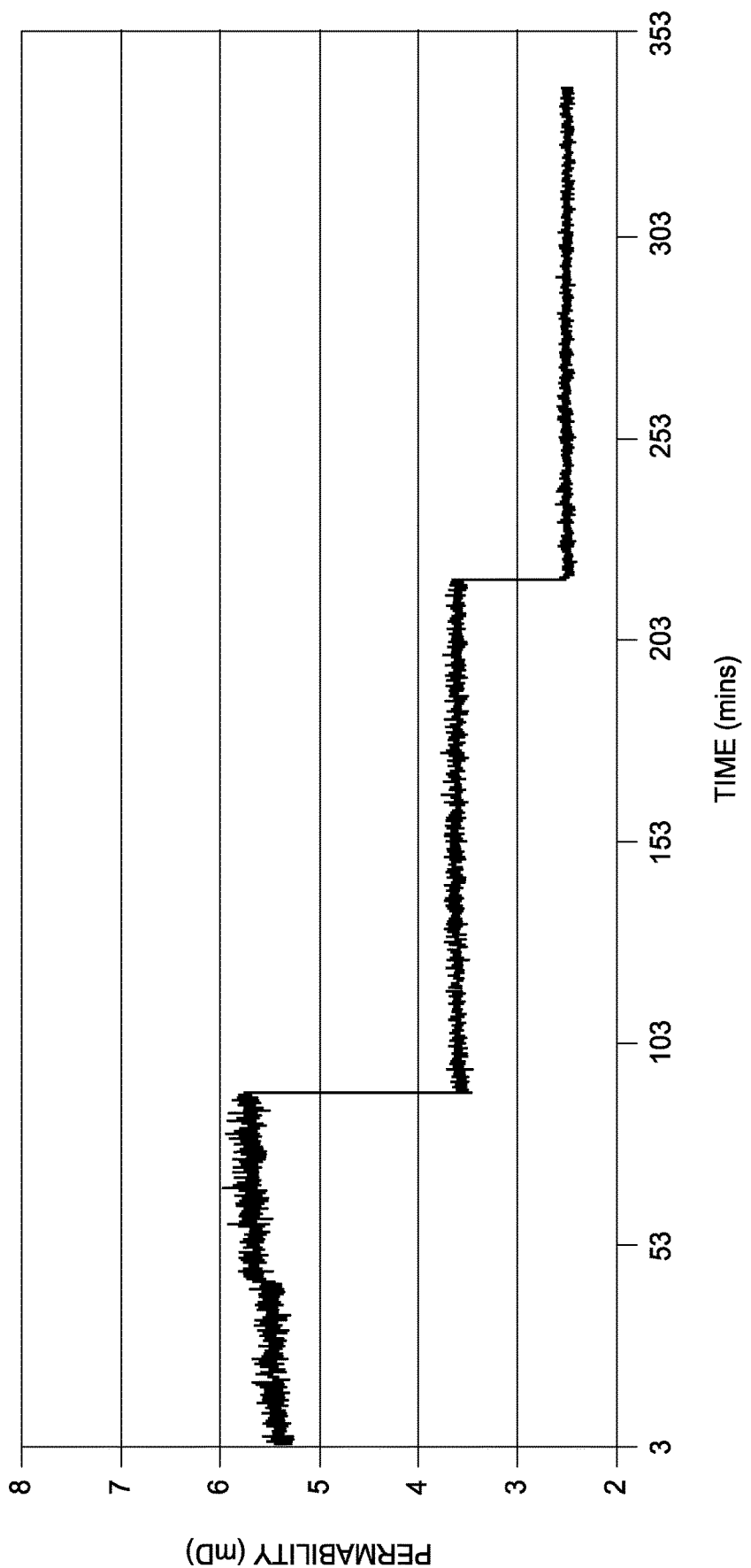
FIG. 3 shows the permeability of a split shale core after treatment with consolidating agent coated fly ash microspheres according to one or more embodiments disclosed herein.

The permeability results of CC1, shown in FIG. 2, and the permeability results of TC1, shown in FIG. 3, were compared. Of note, the treatment fluid used to prepare CC1 was selected to provide a "best scenario" baseline by reducing exposure to treatment fluid additives that may result in gel residue, flow path blockage, and the like. The results for CC1 demonstrate that at 700 psi, 600 psi, and 500 psi, the permeability was approximately 0.75 mD, 0.7 mD, and 0.68 mD, respectively. The results for TC1 demonstrate that at 700 psi, 600 psi, and 500 psi, the permeability was approximately 5.5 mD, 3.5 mD, and 2.5 mD, respectively. Accordingly, the permeability of TC1 as compared to CC1 was significantly increased by the presence of the fly ash microspheres and the consolidating agent.

Example 2

In this example, the permeability of a fracture network was evaluated using consolidating agent coated fly ash microspheres described herein. Two shale core samples having a 2.54 centimeter ("cm") (1 inch ("in")) diameter and a 5.08 cm (2 in) length were obtained from outcrops of a shale formation. An artificial fracture network was created in each core by first using a DREMEL® tool to score an indention at the top of the core sample based on the samples natural fracture plane, followed by using a wide-blade chisel and hammer to axially split the core along the fracture plane into two halves.

Control Core 2 ("CC2") was prepared without the fly ash microspheres described herein. Each half of CC2 was immersed in a treatment fluid comprising 2% v/v of an organic clay stabilizing agent in an aqueous base fluid for 5 minutes ("min") at 60° C. (140° F.). Thereafter, each of the halves of CC2 were joined back together and places in a Hassler-type core holder to determine permeability of the core. The confining pressure was gradually increased to 1,200 psi and a backpressure of 200 psi was applied. The permeability was evaluated at 60° C. (140° F.) using nitrogen gas at three flow rates of 500 psi, 600 psi, and 700 psi, beginning with the highest flow rate.

Next Test Core 2 ("TC2") was prepared using a treatment fluid comprising fly ash microspheres and a consolidating agent. Each half of TC1 was first vertically immersed in a beaker comprising a pre-treatment fluid of 95% v/v isopropanol aqueous-miscible base fluid and 5% v/v of a polyethylene amine consolidating agent. TC2 was immersed in the pre-treatment fluid for 10 min at 60° C. (140° F.) while the pre-treatment fluid was stirred at 700 rpm. Thereafter, the halves of TC2 were removed and immediately vertically immersed in a fly ash microsphere treatment fluid comprising 2% v/v of an organic clay stabilizing agent in an aqueous base fluid, 5 lb/Mgal guar gum friction reducing agent, and 0.1 lb/gal Class C fly ash microspheres for 5 min at 60° C. (140° F.)), while stirring at 700 rpm. Next, the halves of TC2 were joined back together and tested for permeability as described with reference to CC2 above.

Figure 4:
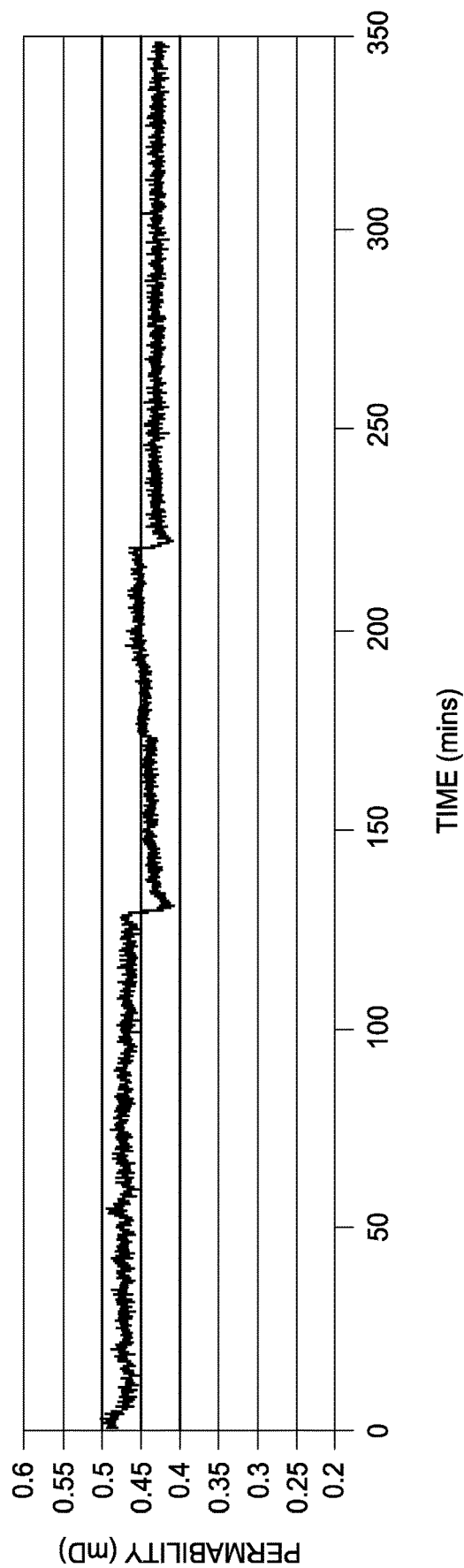
FIG. 4 depicts the permeability of a split shale core before treatment with the fly ash microspheres described herein.
Figure 5:
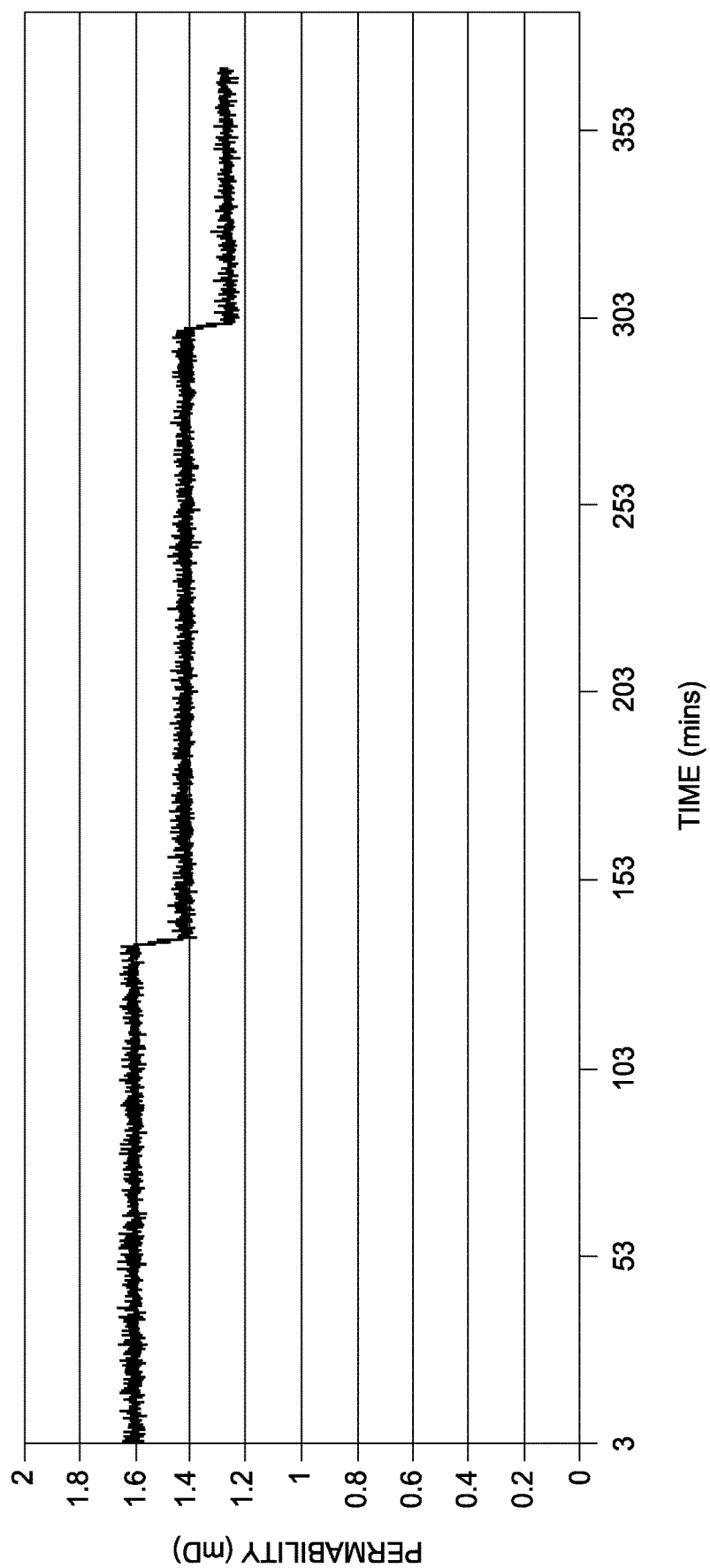
FIG. 5 shows the permeability of a split shale core after treatment with consolidating agent coated fly ash microspheres according to one or more embodiments disclosed herein.

The permeability results of CC2, shown in FIG. 4, and the permeability results of TC2, shown in FIG. 4, were compared. The results for CC2 demonstrate that at 700 psi, 600 psi, and 500 psi, the permeability was approximately 0.47 mD, 0.45 mD, and 0.43 mD, respectively. The results for TC2 demonstrate that at 700 psi, 600 psi, and 500 psi, the permeability was approximately 1.6 mD, 1.4 mD, and 1.3 mD, respectively. Accordingly, the permeability of TC2 as compared to CC2 was substantially increased by the presence of the fly ash microspheres and the consolidating agent.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
   mixing a first treatment fluid comprising a first base fluid, a consolidating agent, and fly ash microspheres at a wellsite,
   wherein the fly ash microspheres are hollow particulates,
   wherein the consolidating agent is present in the first treatment fluid in an amount of about 0.01% to about 5% by volume of the fluid, wherein the consolidating agent comprises a polyamide; wherein the consolidating agent further comprises a binder comprising a hydrolysate or heterocondensate of at least one hydrolysable silicon compound and at least one metal, phosphorous, or boron compound with the metal being selected from Al, Ge, Sn, Pb, Ti, Mg, Li, V, Nb, Ta, Zr, and Hf; wherein the binder further comprises an organic polymerizable or polycondensable monomer or oligomer; and wherein the binder further comprises a buffer capable of buffering the pH of the binder to a range of between about 2 to about 7;

introducing the first treatment fluid into a subterranean formation above a fracture gradient sufficient to create or enhance a first fracture network;
the first fracture network comprising a first main fracture and a first microfracture and greater than 50% of the fly ash microspheres are Class C fly ash microspheres;

placing the fly ash microspheres into the first microfracture to form a partial monolayer of the fly ash microspheres therein;

introducing into the subterranean formation a second treatment fluid comprising a second base fluid and proppant particulates above the fracture gradient; and placing the proppant particulates into the first main fracture to form at least a partial monolayer of the proppant particulates therein,
wherein the first fracture network has a permeability of about 0.43 mD to about 5.5 mD at a confining pressure of about 200 psi to about 1,200 psi.

2. The method of claim 1, wherein the fly ash microspheres further comprise Class F fly ash microspheres.

3. The method of claim 1, wherein the fly ash microspheres have a diameter in the range of from about 0.1 µm to about 150 µm.

4. The method of claim 1, wherein the fly ash microspheres are present in the first treatment fluid in an amount in the range of from about 0.001 ppg to about 1 ppg of the first treatment fluid.

5. The method of claim 1, wherein the proppant particulates have a diameter in the range of from about 150 µm to about 1250 µm.

6. The method of claim 1, wherein the proppant particulates are present in the second treatment fluid in an amount in the range of from about 0.1 ppg to about 12 ppg of the second treatment fluid.

7. The method of claim 1, wherein a second consolidating agent is included in the second treatment fluid, wherein the second consolidating agent comprises a material selected from the group consisting of a non-aqueous tackifying agent, an aqueous tackifying agent, a curable resin, a silyl-modified polyamide compound, a crosslinkable aqueous polymer composition, a polymerizable organic monomer composition, a binder, a silicon-based resin, a zeta potential-modifying aggregating composition, a consolidating agent emulsion, and any combination thereof.

8. The method of claim 7, wherein the second consolidating agent is present in an amount in the range of from about 0.01% to about 5% by volume of the fluid.

9. The method of claim 1, wherein a friction reducing agent is included in a fluid selected from the group consisting of the first treatment fluid, and second treatment fluid, and any combination thereof.

10. The method of claim 1, wherein the fly ash microspheres are metered into the first treatment fluid while the first treatment fluid is introduced into the subterranean formation.

11. The method of claim 1, further comprising a wellhead with a tubular extending therefrom and into the subterranean formation, and a pump fluidly coupled to the tubular, wherein a fluid selected from the group consisting of the first treatment fluid, the second treatment fluid, and any combination thereof is introduced into the subterranean formation through the tubular.

12. A method comprising:
introducing a first treatment fluid comprising a first base fluid and coated fly ash microspheres into a subterranean formation above a fracture gradient sufficient to create or enhance a first fracture network, wherein the coated fly ash microspheres are hollow particulates,
wherein the first fracture network comprises a first main fracture and a first microfracture, and
the coated fly ash microspheres comprise fly ash microspheres coated with a consolidating agent and greater than 50% of the coated fly ash microspheres are Class C fly ash microspheres, wherein the consolidating agent comprises a polyamide; wherein the consolidating agent further comprises a binder comprising a hydrolysate or heterocondensate of at least one hydrolysable silicon compound and at least one metal, phosphorous, or boron compound with the metal being selected from Al, Ge, Sn, Pb, Ti, Mg, Li, V, Nb, Ta, Zr, and Hf; wherein the binder further comprises an organic polymerizable or polycondensable monomer or oligomer; and wherein the binder further comprises a buffer capable of buffering the pH of the binder to a range of between about 2 to about 7;

placing the coated fly ash microspheres into the first microfracture to form a partial monolayer of the coated fly ash microspheres therein;

introducing into the subterranean formation a second treatment fluid comprising a base fluid and proppant particulates above the fracture gradient; and placing the proppant particulates into the first main fracture to form at least a partial monolayer of the proppant particulates therein,
wherein the first fracture network has a permeability of about 0.43 mD to about 5.5 mD at a confining pressure of about 200 psi to about 1,200 psi.

13. The method of claim 12, wherein the coated fly ash microspheres further comprise Class F fly ash microspheres.

14. The method of claim 12, wherein the fly ash microspheres have a diameter in the range of from about 0.1 µm to about 150 µm.

15. The method of claim 12, wherein the coated fly ash microspheres are present in the first treatment fluid in an amount in the range of from about 0.001 ppg to about 1 ppg of the first treatment fluid.

16. The method of claim 12, wherein the proppant particulates have a diameter in the range of from about 150 µm to about 1250 µm.

17. The method of claim 12, wherein the proppant particulates are present in the second treatment fluid in an amount in the range of from about 0.1 ppg to about 12 ppg of the second treatment fluid.

18. The method of claim 12, wherein the proppant particulates are coated with a consolidating agent.

19. The method of claim 12, further comprising a wellhead with a tubular extending therefrom and into the subterranean formation, and a pump fluidly coupled to the tubular, wherein a fluid selected from the group consisting of the first treatment fluid, the second treatment fluid, and any combination thereof is introduced into the subterranean formation through the tubular.

20. A treatment fluid comprising:
a base fluid;
fly ash microspheres, the fly ash microspheres formed of a material selected from the group consisting of Class C fly ash and Class F fly ash, wherein greater than 50% of the fly ash microspheres are Class C fly ash microspheres, wherein the fly ash microspheres are hollow particulates, the fly ash microspheres having a diameter in the range of from about 0.1 µm to about 150 µm, and the fly ash microspheres being present in the treatment fluid in an amount in the range of from about 0.001 ppg to about 1 ppg of the treatment fluid;

a consolidating agent, wherein the consolidating agent is present in the treatment fluid in an amount of about of about 0.01% to about 5% by volume of the treatment fluid, wherein the consolidating agent comprises a polyamide, wherein the consolidating agent further comprises a binder comprising a hydrolysate or heterocondensate of at least one hydrolysable silicon compound and at least one metal, phosphorous, or boron compound with the metal being selected from Al, Ge, Sn, Pb, Ti, Mg, Li, V, Nb, Ta, Zr, and Hf; wherein the binder further comprises an organic polymerizable or polycondensable monomer or oligomer; and wherein the binder further comprises a buffer capable of buffering the pH of the binder to a range of between about 2 to about 7; and wherein the treatment fluid is mixed at a wellsite.

* * * * *